US011398007B2

(12) United States Patent
Kawabe

(10) Patent No.: US 11,398,007 B2
(45) Date of Patent: Jul. 26, 2022

(54) VIDEO GENERATION DEVICE, VIDEO GENERATION METHOD, PROGRAM, AND DATA STRUCTURE

(71) Applicant: NIPPON TELEGRAPH AND TELEPHONE CORPORATION, Tokyo (JP)

(72) Inventor: Takahiro Kawabe, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 44 days.

(21) Appl. No.: 17/045,991

(22) PCT Filed: Apr. 2, 2019

(86) PCT No.: PCT/JP2019/014645

§ 371 (c)(1),
(2) Date: Oct. 7, 2020

(87) PCT Pub. No.: WO2019/198570

PCT Pub. Date: Oct. 17, 2019

(65) Prior Publication Data

US 2021/0125305 A1 Apr. 29, 2021

(30) Foreign Application Priority Data

Apr. 11, 2018 (JP) ............................. JP2018-076166

(51) Int. Cl.
*G06T 3/00* (2006.01)
*G06T 7/00* (2017.01)
(Continued)

(52) U.S. Cl.
CPC ................ *G06T 3/00* (2013.01); *G06T 7/174* (2017.01); *G06T 7/248* (2017.01); *G06T 7/37* (2017.01);
(Continued)

(58) Field of Classification Search
CPC ........... G06T 3/00; G06T 7/174; G06T 7/248; G06T 7/37; G06T 7/97;
(Continued)

(56) References Cited

U.S. PATENT DOCUMENTS

| | | | | |
|---|---|---|---|---|
| 6,530,662 B1 * | 3/2003 | Haseltine | ............... | G02B 30/56 353/62 |
| 2018/0262741 A1 * | 9/2018 | Funk | .................... | H04N 13/324 |

FOREIGN PATENT DOCUMENTS

JP 4963124 B2 * 6/2012

OTHER PUBLICATIONS

Kawabe, Takahiro (2018) "Ukuzo—A Projection Mapping Technique to Give Illusory Depth Impressions to Two-dimensional Real Objects" NTT Technical Review, Sep. 1, 2018, vol. 30, No. 9, pp. 20-23, ISSN0915-2318 with its English translation generated by computer.

(Continued)

*Primary Examiner* — Chan S Park
*Assistant Examiner* — Daniel C Chang

(57) ABSTRACT

A video of a shadow is automatically generated to create an illusion that a region included in a real object floats above a background and an apparent height of the region with respect to a background region changes with time. A video generation device receives input of a dark region image including a dark region that is a spatial region corresponding to a target object and is darker than a background, and control information for specifying a motion to be given to the dark region, and obtains and outputs a video including a shadow region is obtained and output. The shadow region is obtained by performing mask processing on a motion region obtained by giving the motion to the dark region according to the control information. The mask processing replaces pixels of a mask region at a spatial position corresponding (Continued)

to the target object with pixels brighter than the motion region. Superimposing an output video corresponding to this video on a real object causes an observer, who views the real object on which the output video is superimposed, to have an illusion that a target region included in the real object corresponding to the target object floats above a background region and an apparent height of the target region with respect to the background region changes with time.

14 Claims, 15 Drawing Sheets

(51) Int. Cl.
*G06T 7/174* (2017.01)
*G06T 7/246* (2017.01)
*G06T 7/37* (2017.01)

(52) U.S. Cl.
CPC ...... *G06T 7/97* (2017.01); *G06T 2207/10016* (2013.01)

(58) Field of Classification Search
CPC ........... G06T 2207/10016; G06T 11/60; G06T 15/60; G09G 5/00; G09G 5/10; G09G 5/36; H04N 13/122; H04N 13/363
See application file for complete search history.

(56) References Cited

OTHER PUBLICATIONS

Kawabe, Takahiro, "FUkuzo—A Projection Mapping Technique to Give Illusory Depth Impressions to Two-dimensional Real Objects" NTT Technical Review, Sep. 1, 2018, vol. 30, No. 9, pp. 20-23, ISSN0915-2318 with its English translation generated by computer.
Kersten et al. (1996) "Illusory motion from shadows," Nature, 379 (6560), p. 31, [retrieved on Mar. 14, 2018], Internet <https://doi.org/10.1038/379031a0>.
Joon Y. Moon (2010) "Augmented shadow" [retrieved on Mar. 14, 2018], Internet <http://joonmoon.net/Augmented-Shadow>.

* cited by examiner

VIDEO GENERATION DEVICE, VIDEO GENERATION METHOD, PROGRAM, AND DATA STRUCTURE

CROSS-REFERENCE TO RELATED APPLICATIONS

This application is a U.S. 371 Application of International Patent Application No. PCT/JP2019/014645, filed on 2 Apr. 2019, which application claims priority to and the benefit of JP Application No. 2018-076166, filed on 11 Apr. 2018, the disclosures of which are hereby incorporated herein by reference in their entireties.

TECHNICAL FIELD

The present invention relates to a technique for creating a visual illusion, and more particularly, to a technique for creating a motion illusion.

BACKGROUND ART

In general, adding a shadow to an object in an image is made by use of computer graphics. The use of commercially available computer graphics software makes it possible to easily add a shadow to an object in an image. The use of such software also makes it possible to correctly add shadow to an object in an image in a physical view.

On the other hand, a technique is reported that devises a projection method in computer graphics to change only the position and shape of a shadow cast on a region near an object without changing the size of the object in an image so that an illusion makes the object appear to float. For example, assume that there are an object A and an object B behind the object A, which is different from the object A. Also, assume that the object A has a smaller assumed physical size than the object B. Also, assume that the object A and the object B are on an image capturing direction axis of a camera, and the object B is visible outside the object A. Rendering a state in which the object A is in contact with the object B results in that the object A does not cast a shadow on the object B. On the other hand, in a state in which the object A has a different depth positional relationship from the object B, a light source is located at a position away from the image capturing direction axis, and the object A is closer to the camera than the object B, the object A casts a shadow on the object B. On the other hand, the size of the object A changes before and after the object A is away from the object B. Specifically, the size of the object A increases as the object A is closer to the camera. In NPL 1, a square corresponding to the object A and a background corresponding to the object B are arranged so that they are orthogonal to an image capturing direction axis of a camera. When the square is moved closer to the camera, the square casts a shadow on the background. Normally, the size of the square increases as the square is closer to the camera. By contrast, in NPL 1, vertical projection is used at the time of image capturing in order to eliminate a change in the size of the square. Thus, when the depth of the square is changed, a shadow of the square can be generated in the background without changing the size of the square (see NPL 1, etc.). Using this technique makes it possible to create an illusion as if the square floated above the background. Also, there has been published a work of art that can darken a region near a three-dimensional object placed on a tabletop screen to make it appear as if a shadow were cast on the region (e.g., see NPL 2, etc.).

CITATION LIST

Non Patent Literature

[NPL 1] Kersten, D., Knill, D. C., Mamassian, P., & Bulthoff, I. (1996). “Illusory motion from shadows,” Nature, 379 (6560), p. 31, [retrieved on 2018 Mar. 14], Internet <https://doi.org/10.1038/379031a0>

[NPL 2] Joon Y. Moon, “Augmented shadow,” (2010), [retrieved on 2018 Mar. 14], Internet <http://joonmoon.net/Augmented-Shadow>

SUMMARY OF THE INVENTION

Technical Problem

As conventional techniques, there have been proposed a method of adding a shadow to an object displayed on a screen and a method of giving a depth effect due to a shadow to an object on a screen. However, there is no known technique for automatically generating a video of a shadow to create an illusion that a region included in a real object floats above a background and an apparent height of the region with respect to a background region changes with time. In NPL 1, a technique is proposed that uses a vertical projection method to change only the position of a shadow without changing the size of an object so as to realize an illusion that the object on a screen is at a different depth. On the other hand, the use of this method requires advanced knowledge such as a projection method in computer graphics, light source settings, and object modeling. Further, the implementation of the processing of NPL 1 requires specialized software for computer graphics, and the processing cannot be implemented with general image processing software. Further, if NPL 1 is implemented to add a shadow to a region included in a real object, it is necessary to acquire accurate three-dimensional information of a real object to which a shadow is to be added and perform processing of converting the three-dimensional information into a format available for specialized software of computer graphics. Such processing takes a long time, so that it is very hard to immediately cope with a case where the shape, position, or position of the real object to which a shadow is to be added is changed. From the above circumstances, it is desirable to use a simple image processing technique that is economical to calculate in order to add a shadow to a real object to create an illusion that the real object floats above the background. The technique used in NPL 2 is to display a shadow cast by a real object on a tabletop screen when a light source is assumed. However, the apparent height of the region of the real object is constant.

The present invention has been made in view of such circumstances, and an object of the present invention is to provide a simple image processing technique for automatically generating a video of a shadow to create an illusion that a region included in a real object floats above a background and an apparent height of the region with respect to a background region changes with time.

Means for Solving the Problem

Input of a dark region image including a dark region that is a spatial region corresponding to a target object and is darker than a background, and control information for specifying a motion to be given to the dark region are received, and a video including a shadow region is obtained and output. The shadow region is obtained by performing mask processing on a motion region obtained by giving the motion to the dark region according to the control information. The mask processing replaces pixels of a mask region at a spatial position corresponding to the target object with pixels brighter than the motion region. Superimposing an output video corresponding to this video on a real object causes an observer, who views the real object on which the output video is superimposed, to have an illusion that a target region included in the real object corresponding to the target object floats above a background region and an apparent height of the target region with respect to the background region changes with time.

Effects of the Invention

As described above, it is possible to automatically generate, by a simple image processing technique, a video of a shadow to create an illusion that a region included in a real object floats above a background and an apparent height of the region with respect to a background region changes with time.

DESCRIPTION OF EMBODIMENTS

Figure 1:
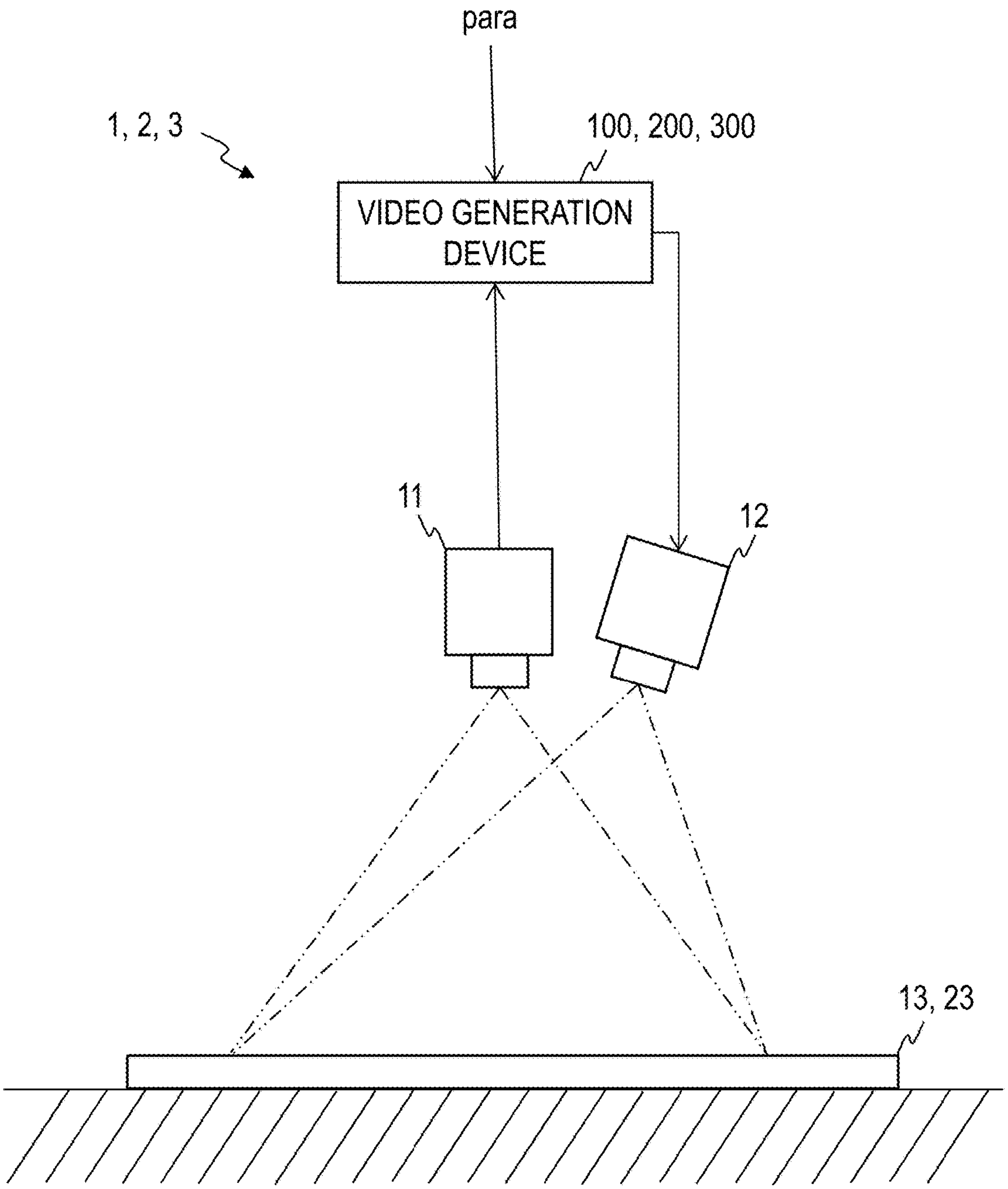
FIG. 1 is a conceptual diagram illustrating a configuration of an illusion system according to an embodiment.

Hereinafter, embodiments of the present invention will be described with reference to the drawings.

[Overview]

To begin with, an overview of the present embodiment will be described.

A video generation device according to the embodiment includes a video generation unit that receives input of a dark region image including a dark region that is a spatial region corresponding to a target object and is darker than a background, and control information for specifying a motion to be given to the dark region, and obtains and output a video including a shadow region. The shadow region is obtained by performing mask processing on a motion region obtained by giving the motion to the dark region according to the control information. The mask processing replaces pixels of a mask region at a spatial position corresponding to the target object with pixels brighter than the motion region. Superimposing an output video corresponding to this video on a real object can cause an observer, who views the real object on which the output video is superimposed, to have an illusion that a target region included in the real object corresponding to the target object floats above a background region (moves in the depth direction) and an apparent height of the target region with respect to the background region (a distance in the depth direction from a plane on which the target object is actually placed) changes with time. In other words, superimposing the output video on the real object adds a time-varying shadow to the target region included in the real object, so that the observer has an illusion that the target region, which is supposed not to float, floats and the apparent depth changes with time.

There are several factors that cause a shadow to translate in the physical world. They include, for example, a case where an object floats in the depth direction, and a case where a background surface on which a shadow is cast moves away in the depth dimension. In addition, a case where the position of a light source moves so that the direction of a background surface is changed may also cause similar shadow changes. On the other hand, as NPL 1 discloses, humans generally do not expect the movement of a light source perceptually. Further, in general, when there is no other clue such as texture or binocular parallax, it is difficult to perceive a change in the depth direction of the background surface. Therefore, when a shadow translates, a perceptual interpretation that there is a depth between the object and the background surface is adopted. This is the cause of the depth illusion caused by shadows.

The "target object" refers to an object corresponding to a spatial region by which an illusion of moving in the depth direction is to be created. The "target object" may be anything that provides information for specifying a spatial region by which an illusion of moving in the depth direction is to be created. The "target object" may exist in the real space or may not exist in the real space. For example, the "target object" may be an actual object (a flat object or a three-dimensional object) existing in the real space, may be a region appearing on the outer surface of an actual object, may be an image region projected on the surface of an actual object, may be an image region displayed on a display, may be a virtual object (a flat object or a three-dimensional object) existing in a virtual space, may be image data in which pieces of spatial position information (coordinates) indicating a spatial region and pixel values at spatial positions specified by the respective pieces of spatial position information are specified, or may be numerical data for specifying spatial position information indicating a spatial region. For example, the "region appearing on the outer surface of an actual object" may be a region that is printed or drawn on the actual object, may be a region that appears as a representational shape of the actual object, or may be a design based on a material of the surface of the actual object.

The "dark region" is also a spatial region corresponding to the "target object". For example, the "dark region" may be a spatial region having the same shape or substantially the same shape as the "target object", may be a spatial region similar or substantially similar to the "target object", may be a spatial region obtained by rotating a spatial region having the same shape as, substantially the same shape as, similarity to, or substantially similarity to the "target object", may be a spatial region obtained by projecting a spatial region having the same shape as, substantially the same shape as, similarity to, or substantially similarity to the "target object", onto a predetermined plane, may be a spatial region obtained by spatially distorting a spatial region having the same shape as, substantially the same shape as, similarity to, or substantially similarity to the target object, or may be a region obtained by performing filtering (e.g., image blurring processing, image sharpening processing, contrast changing processing, brightness changing processing, high-pass filtering processing, low-pass filtering processing, etc.) on any of these spatial regions. The "dark region" may be a region having the same brightness (luminance or lightness) as the target object, may be a region darker than the target object, or may be a region brighter than the target object. Here, the "dark region image" includes a "dark region" and a "background", and the "background" is brighter than the "dark region". Note that "substantially the same" refers to that they can be regarded as the same. For example, "$\alpha$ has substantially the same shape as $\beta$" refers to that $\alpha$ and $\beta$ can be regarded as having the same shape. For example, "$\alpha$ has substantially the same shape as $\beta$" refers to that the area of the difference between $\alpha$ and $\beta$ is $\gamma$ % or less of $\alpha$. Also, "substantially similar" refers to that they can be regarded as similar. For example, "$\alpha$ is substantially similar in shape to $\beta$" refers to that the minimum value of the area of the difference between $\alpha'$ and $\beta$ is $\gamma$ % or less, where $\alpha'$ is an enlargement or reduction of $\alpha$. Examples of $\gamma$ are $\gamma$=1 to 30, and $\gamma$ may be set in a range such that $\alpha$ and $\beta$ can be recognized, but depending on the individual, as having substantially the same shape.

The "control information" specifies a motion to be given to the "dark region". The motion to be given to the "dark region" may be specified by a function, may be set by a function and other values, or may be specified by a reference table in which information indicating the motion is associated with an identifier. For example, the "function" is a time function using at least time information as a variable, and may be a linear function or may be a non-linear function. The control information may include information for specifying the "function", may include information of the identifier for referring to the reference table, or may include information for specifying other motions. For example, when the motion to be given to the "dark region" is a translation (translational movement) in a certain direction, the "control information" includes, for example, an intercept (the initial value of an amount of movement) for specifying a linear function that outputs an amount of movement at each time point with respect to time information, a maximum amount of movement, the number of frames corresponding to a series of motions to be given to the "dark region" (e.g., the number of frames of motion for one cycle, the maximum number of frames), and a moving direction. Note that, when the translation to be given to the "dark region" is a translation in one direction (one-way translational motion), a motion from the start to the end of the movement is regarded as a motion for one cycle. On the other hand, when the translation to be given to the "dark region" is reciprocating motions that it reciprocates a certain distance (reciprocating motions in which translational motions in opposite directions are alternately repeated), one reciprocating motion is regarded as a motion for one cycle. Also, the "frames" are images of which a video is composed, and each has a size in a spatial dimension and a length in a time dimension. The length of a frame in the time dimension depends on the vertical frequency of an image (video) display device. For example, for one second of video composed of 30 frames of images, one frame has a length of 1/30 second. In other words, it can be said that one frame represents a predetermined time segment.

There is no limitation on the direction or magnitude of the motion to be given to the "dark region". Here, when each "motion region" is a region obtained by spatially translating the "dark region", a viewing angle for an amount of movement of the "motion region" with respect to the "dark region" as viewed at a certain distance from the dark region is desirably equal to or less than a predetermined value (e.g., 0.35 degrees). For example, it is set such that the amount of movement of the motion region with respect to the "dark region" as viewed at a distance of 100 cm from the dark region is 0.61 cm or less. This makes it possible to clearly perceive the above-described illusion. Further, each "motion region" is desirably a region obtained by spatially translating the "dark region" in a direction including a direction component from the "dark region" toward the "observer" side (e.g., a direction from the dark region" toward the "observer" side). This makes it possible to clearly perceive the above-described illusion. Further, the spatial position of the "motion region" changes with time. For example, when the "motion region" is a region obtained by translating the "dark region", the amount of movement of the "motion region" with respect to the "dark region" changes with time. The amount of movement of the "motion region" with respect to the "dark region" may change periodically or may change aperiodically. For example, when the amount of movement of the "motion region" with respect to the "dark region" monotonically increases in the "predetermined time segment" or monotonically decreases in the predetermined time segment, the "predetermined time segment" is desirably 0.5 seconds or more. More preferably, the "predetermined time segment" is desirably one second or more. This makes it possible to clearly perceive the above-described illusion. For example, when the movement of the "motion region" with respect to the "dark region" is periodic (e.g., reciprocating motion), and the "predetermined time segment" is a period of time corresponding to half the number of frames (maximum number of frames) for one cycle, the maximum number of frames desirably corresponds to a period of time of one second or more. The details will be described later.

The sharpness of the "dark region" is desirably lower than the sharpness of the "target object". In other words, the "dark region" is desirably a blurred region of the image of the "target object". In the physical world, not only a single straight beam but also light in various directions, such as reflected light and scattered light, are often blocked by an object to form a shadow. Accordingly, the outline of an actual shadow is often blurred. Making the sharpness of the "dark region" lower than the sharpness of the "target object" results in a blurred outline of the "shadow region", and such a condition can be imitated. This makes it possible to clearly perceive the above-described illusion. The details will be described later.

In the physical world, the luminance of a shadow increases as the object moves away from the surface onto which the shadow is projected. In order to imitate such a condition, the brightness of the "motion region" (which may be represented by luminance, may be represented by RGB values, or may be represented by other index of image intensity) in which an amount of movement with respect to the "dark region" is a "first value" is desirably lower than the brightness of the "motion region" in which an amount of movement with respect to the "dark region" is a "second value". Here, the "first value" is smaller than the "second value". In this case, the brightness of the "shadow region" corresponding to the "motion region" in which the amount of movement with respect to the "dark region" is the "first value" is lower than the brightness of the "shadow region" corresponding to the "motion region" in which the amount of movement with respect to the "dark region" is the "second value". For example, it is desirable that the smaller the amount of movement of the "motion region" with respect to the "dark region", the lower the brightness of the "motion region". In this case, the smaller the amount of movement of the "motion region" with respect to the "dark region", the lower the brightness of the "shadow region". This makes it possible to clearly perceive the above-described illusion. The details will be described later.

The "mask processing" is performed on the "motion region" to replace pixels of the "mask region" at the spatial position corresponding to the "target object" with pixels having higher luminance than those in the "dark region". In other words, pixels of the "mask region" of the "motion region" are replaced with pixels having higher luminance than those in the "dark region". For example, the "mask processing" is processing of replacing pixels of the "mask region" of the "motion region" with pixels having the same or substantially the same luminance as pixels around the "motion region" (e.g., pixels around the "motion region"). For example, the spatial position of the "mask region" is the same or substantially the same as the spatial position of the "dark region". A spatial position a and a spatial position β being substantially the same refers to that they can be regarded as the same. For example, the spatial position a of the "mask region" and the spatial position β of the "dark region" being substantially the same refers to that the difference between the spatial position a and the spatial position β is γ % or less of the area of the "mask region". For example, the spatial region of the "mask region" may be the same or substantially the same as the spatial region of the "dark region", or may be the same or substantially the same as a part (e.g., an edge portion) of the spatial region of the "dark region". A spatial region α and a spatial region β being substantially the same refers to that they can be regarded as the same. For example, the spatial region a and the spatial region β being substantially the same refers to that the area of the difference between the spatial region a and the spatial region β is γ % or less of a. Note that the "edge" refers to a spatial frequency component whose absolute value is larger than zero. Note that the "motion region" is obtained by giving a motion to the "dark region". Accordingly, the spatial position of the "motion region" in at least one or some frames is different from the spatial position of the "dark region". Therefore, the spatial position of the "mask region" in at least one or some frames is different from the spatial position of the "dark region".

As described above, the "video" includes a shadow region obtained by performing the "mask processing" on a "motion region". For example, the "video" is a moving picture in which frame images including a shadow region obtained by performing the "mask processing" on a "motion region" are arranged in time series. For example, the area of a "shadow region" included in frame image FP(n) of frame f(n) (where n=1, . . . , N, and N is a positive integer that is half the maximum number of frames) is referred to as D(n). Here, assume that the area D(n) of the "shadow region" monotonically increases from frame f(1) to frame f(N) (i.e., $D(1)<D(2)< \ldots <D(N)$). An example of the "video" in this case will be described.

Example 1 of "Video"

In the "video" of Example 1, period 1 and period 2 are alternately repeated. In period 1, frame image FP(η+1) is displayed after frame image FP(η) where η=1, . . . , N−1 (FP(1)→FP(2)→ . . . →FP(N)). In period 1, the area D(n) of the "shadow region" monotonically increases. Period 1 is followed by period 2. In period 2, frame image FP(λ−1) is displayed after frame image FP(λ) where λ=N, . . . , 2 (FP(N)→FP(N−1)→ . . . →FP(1)). In period 2, the area D(n) of the "shadow region" monotonously decreases. Period 2 is followed by period 1 (FP(1)→FP(2)→ . . . →FP(N)→FP (N)→FP(N−1)→ . . . →FP(1)→FP(2)→ . . . ). In the "video" of Example 1, the display time of each frame image FP(n) is the same. Further, changes in adjacent frame images FP(n) are smoothly connected. For this purpose, smoothing filtering in the time dimension may be performed on each frame image FP(n).

Example 2 of "Video"

In the "video" of Example 2, period 3 and period 4 are alternately repeated. In period 3, frame images of one or some frames included in period 1 are excluded (e.g., randomly excluded). Here, a frame image of a frame closest to the frame for an excluded frame image is further displayed by the number of frames for the excluded frame images. For example, when one frame image FP(n) is excluded, two frame images FP(n−1) are displayed or two frame images FP(n+1) are displayed. For example, when FP(3) is excluded, FP(1)→FP(2)→FP(2)→FP(4)→ . . . →FP(N) are displayed in this order. Period 3 is followed by period 4. In period 4, one or some frame images FP(n) included in period 2 are excluded (e.g., randomly excluded). Here, a frame image of a frame closest to the frame for an excluded frame image is further displayed by the number of frames for the excluded frame images. For example, when FP(N−1) is excluded, FP(N)→FP(N−2)→FP(N−2)→FP(N−3)→ . . . →FP(1) are displayed in this order. That is, in the "video" of Example 2, the display time of at least one frame image is different from the display time of the other frame images. Period 3 is followed by period 4 (e.g., FP(1)→FP(2)→FP (2)→FP(4)→ . . . →FP(N)→FP(N)→FP(N−2)→FP(N−2) →FP(N−3)→ . . . →FP(1) . . . ). Further, changes in adjacent frame images FP(n) are smoothly connected. For this purpose, smoothing filtering in the time dimension may be performed on each frame image FP(n).

The "output video" corresponding to the "video" may be the same as the "video", may be a video composed of images of frames obtained by applying a transformation matrix for coordinate transformation to images of frames of which the "video" is composed, or may be a video obtained by performing another translation (such as filtering) on the "video". Details of the transformation matrix will be described later.

The "real object" refers to anything including an object that adds the shadow represented by the "output video", and including an object to which the shadow is to be added and a region around the object. The "real object" may be an actual object (a flat object or a three-dimensional object) existing in the real space, may be a region appearing on the outer surface of the actual object, may be an image region projected onto the surface of the actual object, or may be an image region displayed on a display. For example, the "region appearing on the outer surface of an actual object" may be a region including a pattern (e.g., a design, a character, a picture, a photograph, or the like) that is printed or drawn on the actual object, may be a region that appears as a representational shape of the actual object, or may be a design based on a material of the surface of the actual object. The "real object" includes the "target region" corresponding to the "target object" and its "background region". That is, the "target region" and the "background region" are each a partial region that appears on the surface of the "real object". For example, the "target object" may be a spatial region having the same shape or substantially the same shape as the "target region", may be a spatial region similar or substantially similar to the "target object", may be a spatial region obtained by rotating a spatial region having the same shape as, substantially the same shape as, similarity to, or substantially similarity to the "target object", may be a spatial region obtained by projecting a spatial region having the same shape as, substantially the same shape as, similarity to, or substantially similarity to the "target object", onto a predetermined plane, may be a spatial region obtained by spatially distorting a spatial region having the same shape as, substantially the same shape as, similarity to, or substantially similarity to the "target object", or may be a region obtained by performing filtering on any of these spatial regions. The "target region" may be a region having an edge, or may be a region having no edge. Note that when the "target region" is a region having no edge, the "target object" may be set independently of the "real object".

The video generation device may further include a thresholding unit that receives input of a target image representing a target object and a background, and obtains a dark region image including a dark region corresponding to a spatial region darker than the reference and a peripheral region of the dark region in the target image. The "reference" is a threshold indicating an index indicating a brightness. The "index indicating a brightness" may be a luminance, may be a lightness, or may be a pixel value of a specific RGB channel. The "index indicating a brightness" of a region darker than the "reference" indicates a brightness darker than the "reference". The thresholding unit compares the "reference" with the "index indicating a brightness" of each pixel, and determines whether or not each pixel is darker than the "reference", and whether or not each pixel is brighter than the "reference". Here, assume that all regions of the "target object" are darker than its "background". Also, assume the "reference" indicates a brightness that is brighter than the "target object" and darker than its "background". In addition, assume that the "peripheral region" is brighter than the "dark region". In this case, the "dark region" and the "motion region" correspond to all regions of the "target object", and the "shadow region" represents shadows corresponding to all regions of the "target object". Superimposing the "output video" corresponding to the "video" including such a "shadow region" on the "real object" causes the observer to have an illusion that the whole "target region" of the "real object" corresponding to the "target object" floats above the "background region" and the apparent height of the "target region" with respect to the "background region" changes with time. Conversely, assume that all regions of the "target object" are brighter than its "background". Also, assume that the "reference" is darker than the "target object" and brighter than its "background". In addition, assume that a "peripheral region" of the "dark region" is brighter than the "dark region". Also in this case, the "dark region" and the "motion region" correspond to all regions of the "target object", and the "shadow region" represents shadows corresponding to all regions of the "target object". Superimposing the "output video" corresponding to the "video" including such a "shadow region" on the "real object" also causes the observer to have an illusion that the whole "target region" of the "real object" corresponding to the "target object" floats above the "background region" and the apparent height of the "target region" with respect to the "background region" changes with time. Further, assume that an "edge region (e.g., an outer edge portion)" of the "target object" is darker than an "inner region (e.g., an inner portion of the edge region)" of the "target object", and the "edge region" and the "inner region" are darker than the "background". Further, assume that the "reference" indicates brightness that is brighter than the "edge region" and darker than the "inner region" and the "background". In addition, assume that a "peripheral region" of the "dark region" is brighter than the "dark region". In this case, the "dark region" and the "motion region" correspond to only the "edge region" of the "target object", and the "shadow region" represents shadows corresponding to only the "edge region" of the "target object". Superimposing the "output video" corresponding to the "video" including such a "shadow region" on the "real object" causes the observer to have an illusion that a part of the "target region" corresponding to the "inner region" of the "target object" has transparency, the "target region" floats above the "background region", and the apparent height of the "target region" with respect to the "background region" changes with time. This makes it possible to change the impression on the material of the "target region" by making use of an illusion as if a shadow were given to the "target region". Conversely, assume that an "edge region (e.g., an outer edge portion)" of the "target object" is brighter than an "inner region (e.g., an inner portion of the edge region)" of the "target object", and the "edge region" and the "inner region" are brighter than the "background". Further, assume that the "reference" indicates brightness that is darker than the "edge region" and brighter than the "inner region" and the "background". In addition, assume that a "peripheral region" of the "dark region" is brighter than the "dark region". Also in this case, the "dark region" and the "motion region" correspond to only the "edge region" of the "target object", and the "shadow region" represents shadows corresponding to only the "edge region" of the "target object". Superimposing the "output video" corresponding to the "video" including such a "shadow region" on the "real object" also causes the observer to have an illusion that a part of the "target region" corresponding to the "inner region" of the "target object" has transparency, the "target region" floats above the "background region", and the apparent height of the "target region" with respect to the "background region" changes with time. When the "target object" corresponds to the "target region" included in the "real object" and the "target region" has an edge, superimposing the edge of a spatial region corresponding to the "target object" in the "output video" on the edge of the "target region" makes it possible for the observer to more clearly perceive the illusion described above. Note that, when the "mask region" is an edge portion of the "target object", it is possible for the observer to perceive the same illusion even without providing a boundary (e.g., a black frame or a white frame) having a brightness different from that of the inner region near the edge of the "target region" of the "object".

There is no limitation on the method of superimposing the "output video" on the "real object". For example, the "output video" may be projected onto the "real object". For example, the "output video" may be superimposed on the "real object" in a manner that the "target object" corresponds to the "target region" included in the "real object", the video generation device includes a space transformation unit that receives input of the "video" and obtains and outputs the "output video" in which the "video" is aligned with the "target region", and the "output video" is projected onto the "real object". Alternatively, the "output video" may be displayed on a transmissive display disposed between the observer and the "real object" so that the observer can observe the "real object" through the transmissive display. This also makes it possible for the observer to perceive that the "output video" is superimposed on the "real object". The observer may observe an video in which the "output video" and the "real object" are digitally superimposed on each other. Alternatively, the "output video" may be displayed on a tabletop display, and the "real object (e.g., a three-dimensional object)" may be arranged on the display. This also makes it possible to superimpose the "output video" on the "real object".

A data structure may be provided in which first data, second data, and third data are associated with each other. The first data indicates an image including a target region, the second data is a video group or an image group which indicates videos corresponding to motions of a plurality of types of shadows (e.g., "shadow region") of the target region, and the third data indicates a parameter group for specifying the motions of the plurality of types of shadows of the target region. Here, the "target region" is a region included in the "real object", and the "image including the target region" is an image representing the "real object". The video group representing the motions of the plurality of types of shadows in the "target region" is a set including elements of "videos" corresponding to the motions of the plurality of types of shadows. Each video belonging to the "video group" corresponds to one in the parameter group indicated by the third data. Each parameter belonging to the "parameter group" includes, for example, information for specifying the motion of a shadow. An examples of information for specifying the motion of a shadow is information including a set of a maximum amount of movement of the shadow, a moving direction of the shadow, and the number of frames in which the shadow is moved (e.g., the number of frames in which the shadow is moved for one cycle). The maximum amount of movement of the shadow, the moving direction of the shadow, and the number of frames in which the shadow is moved, for each motion of the shadow, are associated with each other. In addition, the parameters belonging to the "parameter group" may include a "value corresponding to an apparent height" of the "target region" with respect to the "background region" in which superimposing the "output video" corresponding to the motion of the shadow on the "real object" causes the observer to have an illusion. For example, for the same movement of the shadow, the maximum amount of movement of the shadow, the moving direction of the shadow, the number of frames in which the shadow is moved, and the value corresponding to the apparent height may be associated with each other. Note that the "value corresponding to the apparent height" may be just the "apparent height (a distance in the depth direction from the plane on which the target object is actually placed)", or may be a parameter for specifying the "apparent height". Instead of the "video", a set of "images" with time information corresponding to each frame of the "video" may be provided. Here, the shadow represented by the second data is darker than the background region of the target region, and the parameters belonging to the parameter group indicated by the third data are associated with the respective motions of the shadow of the target region represented by the second data. Note that the video corresponding to the motion of the plurality of types of shadows (e.g., "shadow region") of the target region is, for example, a video generated by the above-described video generation unit.

When the first data, the second data, and the third data are input to a video display device, the video display device superimposes, according to the correspondence of the first data, the second data, and the third data, a video or an image group which represents the motion of the shadow of the target region represented by the second data corresponding to one of the parameters belonging to the parameter group indicated by the third data, on the real object by means of the video display device. Here, the real object is an actual object including the target region represented by the image included in the first data, a virtual object including the target region represented by the image included in the first data, an object on which the target region represented by the image included in the first data is printed or drawn, or the image included in the first data. The video display device may select one of the parameters belonging to the parameter group based on an input, or may select one of the parameters belonging to the parameter group according to a predetermined rule. For example, the video display device may receive input of information for specifying an apparent height that causes the observer to have an illusion, and then the video display device may select a parameter corresponding to the "information for specifying the apparent height". The video display device specifies, for example, a video representing a motion of the shadow of one target region by one selected parameter, and superimposes the video on the real object. Alternatively, the video display device selects, for example, an image group with time information which represents a motion of the shadow of one target region by the selected one parameter and in which images are grouped, and superimposes, as each frame image, each image in the selected image group on the real object according to the time information. This makes it possible to cause the observer who views the real object on which the video or the image group is superimposed to have an illusion that the target region floats above the background region and the apparent height of the target region with respect to the background region changes with time.

Here, the "target region" may include a first edge whose absolute value is a spatial frequency component larger than zero, the "video group" or the "image group" may include a second edge corresponding to the first edge, the first data may be data in which image data representing an image is associated with horizontal position information and vertical position information of the image data, and the second data may be data in which image data representing a video included in the video group or an image included in the image group is associated with horizontal position information and vertical position information of the image data. Further, the horizontal position information and the vertical position information of the image data included in the first data may be associated with the horizontal position information and the vertical position information of the image data included in the second data, and the first data and/or the second data may include correspondence information for associating the horizontal position information and the vertical position information of the image data included in the first data with the horizontal position information and the vertical position information of the image data included in the second data. In this case, the video display device may overlay (superimpose) the video or the image group onto the real object by aligning, according to the correspondence information, the horizontal position information and the vertical position information of the image data included in the first data, and the horizontal position information and the vertical position information of the image data included in the second data, the horizontal position and the vertical position of the second edge of the video or the image group representing the motion of the shadow of the target region represented by the second data corresponding to one of the parameters belonging to the parameter group indicated by the third data with the horizontal position and the vertical position of the first edge of the target region in the real object.

First Embodiment

In a first embodiment, a video including a shadow region is generated from a target image captured from a real object, and an output video corresponding to the video is projected onto the real object, thereby causing the observer to have an illusion that the target region included in the real object corresponding to the target object floats above the background region and the apparent height of the target region with respect to the background region changes with time.

<Configuration>

Figure 2:
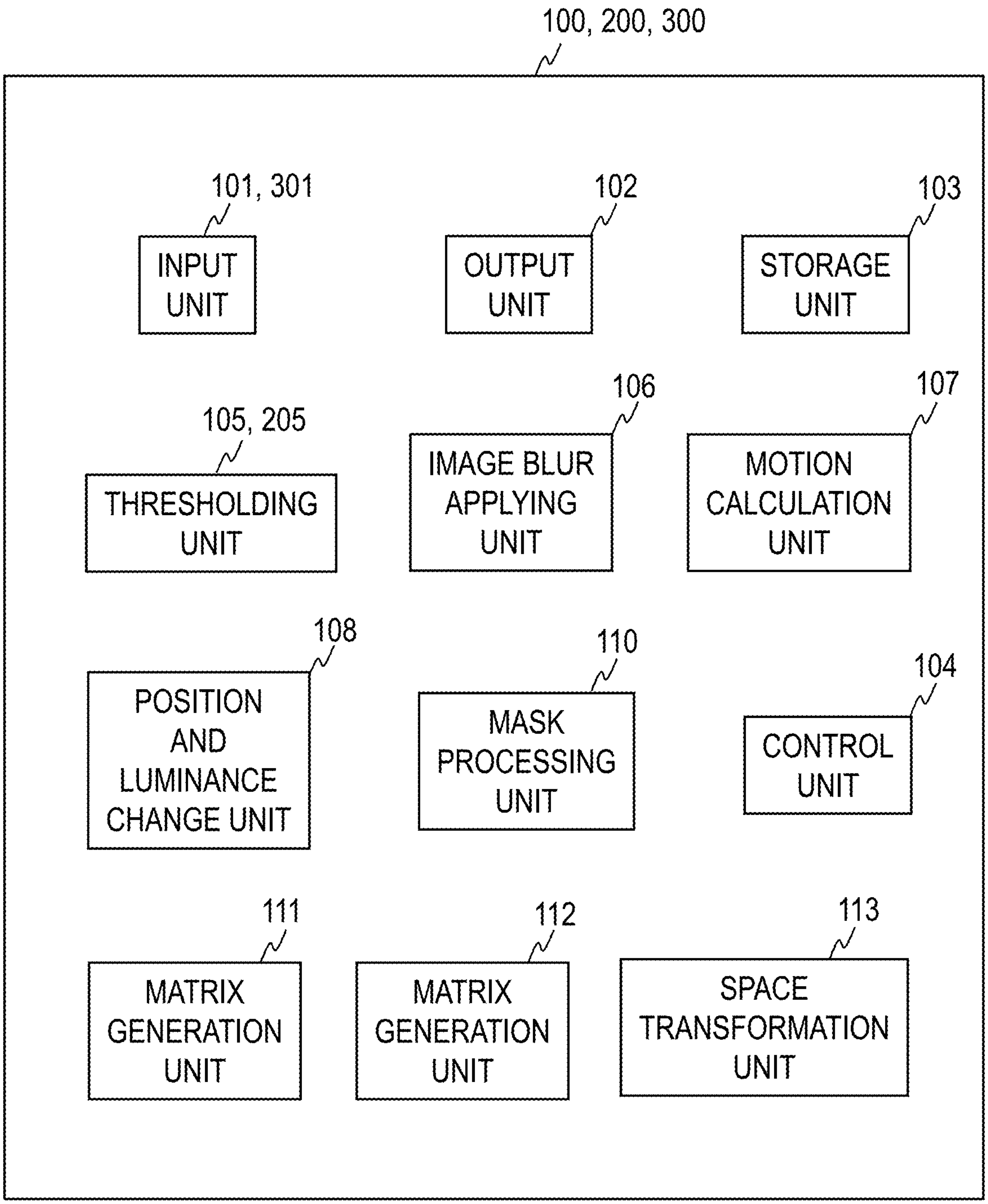
FIG. 2 is a block diagram illustrating a video generation device according to the embodiment.

As illustrated in FIG. 1, an illusion system 1 according to the present embodiment includes a video generation device 100, an image acquisition device 11, and a projection device 12, and projects a generated output video onto a real object 13. As illustrated in FIG. 2, the video generation device 100 according to the present embodiment includes an input unit 101, an output unit 102, a storage unit 103, a control unit 104, a thresholding unit 105, an image blur applying unit 106, a motion calculation unit 107, a position and luminance change unit 108, a mask processing unit 110, a matrix generation units 111 and 112, and a space transformation unit 113. Note that a set of the motion calculation unit 107, the position and luminance change unit 108, and the mask processing unit 110 is an example of a "video generation unit". The image acquisition device 11 is a device that can capture an external image, and is, for example, a camera or a 3D scanner. The projection device 12 is a device that can project a video, and is, for example, a video projector. Note that the video generation device 100 executes respective steps of processing, but not described below, under the control of the control unit 104. Further, information input to the input unit 101 and information obtained by each unit are stored in the storage unit 103, and are read out as needed to be used for the respective steps of processing.

<Processing>

Processing of the present embodiment will be described. In the present embodiment, light projected from the projection device 12 makes a region of the real object 13 look like a shadow, and causes the observer to have the above-described illusion. The real object 13 on which the light from the projection device 12 falls is composed of a target region in which an illusion as if it were a cause of an apparent shadow is created (the target region blocking the light creates an illusion that a shadow has been formed), and a background region in which an apparent shadow appears (the target region blocking the light creates an illusion that a shadow has been formed on the background region). That is, the "target region" and the "background region" are each a partial region that appears on the surface of the real object 13. The real object 13 according to the present embodiment is a region including a pattern printed or drawn on a real object (e.g., paper). For example, the "target region" is a region of the pattern, and the "background region" is a region other than the pattern. For example, the real object 13 illustrated in FIG. 8A includes a black target region 1101 having an edge 1101$a$ and a background region 1102 other than the black target region 1101. The real object 13 in this example is obtained by printing a photograph obtained by capturing a puzzle, and a gap between puzzles, that is, the region of a missing piece is the target region 1101.

<<Input Processing of Target Image>>

First, the image acquisition device 11 captures an image including the target region 1101 and a part or the whole of the background region 1102, which appear on the surface of the real object 13 (FIG. 8A), and obtains and outputs a target image 1000. For example, the image acquisition device 11 captures or scans the real object 13 from the front, and obtains and outputs the target image 1000. The target image 1000 includes a target object 1001 and a background object (background) 1002. The target object 1001 corresponds to the target region 1101, and the background object 1002 corresponds to a part or the whole of the background region 1102. That is, the target object 1001 is an image of the target region 1101 captured by the image acquisition device 11, and the background object 1002 is an image of a part or the whole of the background region 1102 captured by the image acquisition device 11. In the present embodiment, all regions of the target object 1001 are darker than the background object 1002. The obtained target image 1000 is input to the input unit 101 of the video generation device 100 and sent to the thresholding unit 105 (FIG. 3A).

<<Thresholding Processing>>

Figure 3A:
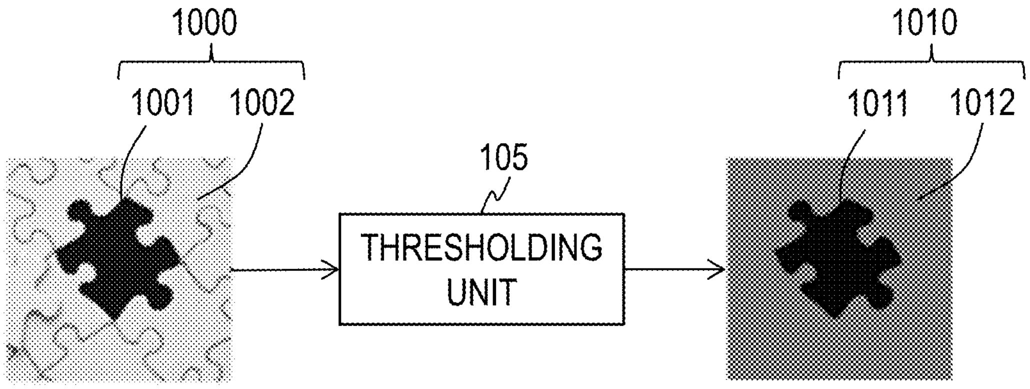
FIG. 3A is a diagram illustrating processing of a thresholding unit according to the embodiment.

As illustrated in FIG. 3A, the thresholding unit 105 receives input of the target image 1000 representing the target object 1001 and the background object 1002, and obtains and outputs a dark region image 1010 including a dark region 1011 corresponding to a spatial region darker than the reference and a peripheral region (background) 1012 of the dark region 1011 in the target image 1000. For example, the thresholding unit 105 obtains, in the input target image 1000, the dark region 1011 in which a pixel value of the spatial region darker than the reference is set to A, and the peripheral region 1012 in which a pixel value of the other spatial region is set to B. The brightness indicated by the pixel value A is darker than the brightness indicated by the pixel value B. In other words, the brightness of the dark region 1011 is darker than the brightness of the peripheral region 1012. The values of the pixel values A and B may be any pixel value of the target image 1000, or may be a pixel value corresponding to any pixel value of the target image 1000 (e.g., a function value for any pixel value of the target image 1000). Alternatively, the values of the pixel values A and B may be set based on the input to the input unit 101 (e.g., the pixel value A is 0 and the pixel value B is 128). In other words, the pixel values of the dark region 1011 and the peripheral region 1012 may be manually set so that the dark region 1011 and the peripheral region 1012 are distinguished from each other. For example, the luminance of the dark region 1011 is lower than the luminance of the peripheral region 1012, or the lightness of the dark region 1011 is lower than the lightness of the peripheral region 1012. Since the dark region 1011 is a region corresponding to a shadow, the dark region 1011 is desirably a black, gray, almost black, or almost gray region. Note that the "reference" in the present embodiment indicates a brightness that is brighter than the target object 1001 and darker than the background object 1002. Further, the thresholding unit 105 determines, using a threshold corresponding to the reference, a spatial region darker than the reference and the other spatial region in the target image 1000. For example, the thresholding unit 105 sets, as the dark region 1011, a spatial region having a pixel value of A in which a luminance, a lightness, a pixel value of any of RGB channels, or pixel values of all RGB channels are lower than the threshold, and sets, as the peripheral region 1012, the other regions having a pixel value of B (a region having a luminance equal to or higher than the threshold). In the present embodiment, all regions of the target object 1001 are darker than the background object 1002, and the reference indicates a brightness that is brighter than the target object 1001 and darker than the background object 1002. Accordingly, a region of all spatial regions having a pixel value of A in the target object 1001 is the dark region 1011, and a region of the other spatial regions having a pixel value of B is the peripheral region 1012. The peripheral region 1012 is brighter than the dark region 1011 (FIG. 3A).

<<Image Blur Applying Processing>>

Figure 3B:
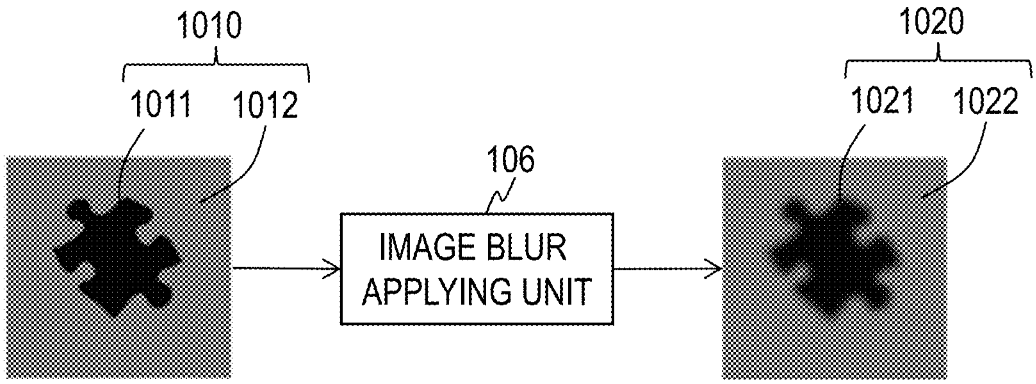
FIG. 3B is a diagram illustrating processing of an image blur applying unit.

The dark region image 1010 output from the thresholding unit 105 is input to the image blur applying unit 106. The image blur applying unit 106 performs image blur applying processing on the input dark region image 1010, obtains a dark region image 1020 which is the resulting image after the image blur applying (the dark region image 1020 includes a dark region 1021 which is a spatial region corresponding to the target object 1001 and darker than a peripheral region (background) 1022), and outputs the dark region image 1020. In other words, the image blur applying unit 106 obtains and outputs the dark region image 1020 in which the sharpness of the input dark region image 1010 is reduced. For example, the image blur applying unit 106 applies a smoothing filter, a Gaussian filter, or the like to the input dark region image 1010 to obtain and output the dark region image 1020. The dark region image 1020 includes the dark region 1021 corresponding to the dark region 1011 after the image blur applying, and the peripheral region (background) 1022 corresponding to the peripheral region 1012 after the image blur applying. The sharpness of the dark region 1021 after the image blur applying is lower than the sharpness of the dark region 1011 before the image blur applying. Further, the sharpness of the dark region 1021 after the image blur applying is lower than the sharpness of the target object 1001 (FIG. 3B).

<<Position and Luminance Change Processing>>

Figure 4:
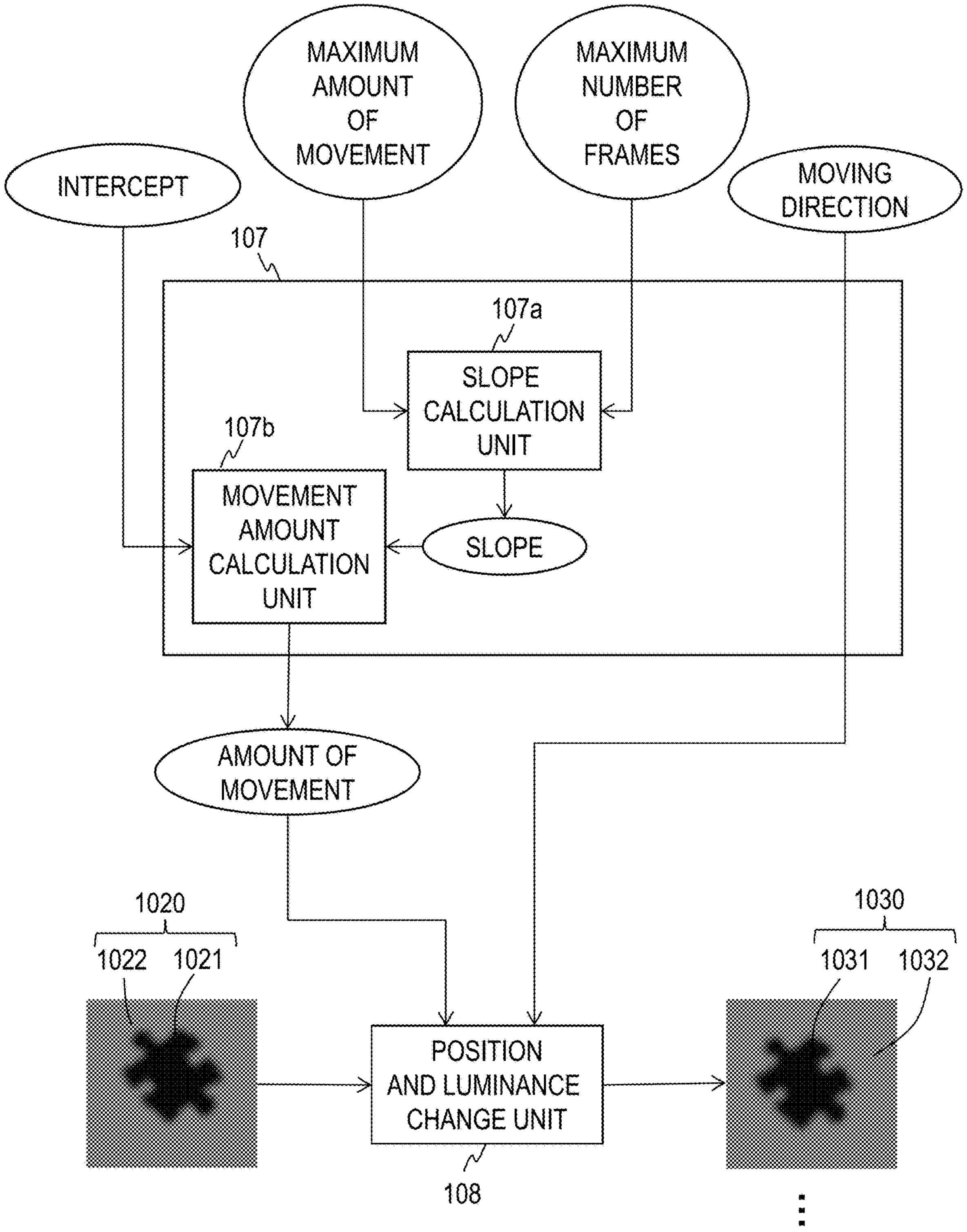
FIG. 4 is a diagram illustrating processing of a motion calculation unit, a position and luminance change unit according to the embodiment.

Next, position and luminance change processing is performed on the dark region image 1020. In the position and luminance change processing, the motion calculation unit 107 specifies a motion to be given to the dark region 1021 based on control information "para", and the position and luminance change unit 108 gives the motion to the dark region 1021 and changes the luminance to obtain a motion region 1031 of each frame, and obtains and outputs, for each frame, a motion image 1030 including the motion region 1031 and a peripheral region (background) 1032. For example, the motion calculation unit 107 specifies an amount of movement and a moving direction of the dark region 1021 in each frame based on the control information para, and the position and luminance change unit 108 moves the dark region 1021 in each frame according to the amount of movement and the moving direction, also performs luminance change on the dark region 1021 to obtain the motion region 1031 for each frame, and obtains and outputs, for each frame, the motion image 1030 including the motion region 1031 and the peripheral region 1032 (FIG. 4). It is desirable that the amount of movement of the motion region 1031 with respect to the dark region 1021 in each frame smoothly increase or decrease across a plurality of consecutive frames. This makes it possible to create an illusion that the above-described "apparent height of the target region with respect to the background region (apparent depth)" continuously changes with time. When the apparent depth is to be gradually increased, the amount of movement of the motion region 1031 in each frame with respect to the dark region 1021 is gradually increased. For example, when the apparent depth is to be gradually increased, the amount of movement of the motion region 1031 in each frame with respect to the dark region 1021 is monotonically increased (or weakly increased or monotonically non-decreased) in a predetermined time segment. Conversely, when the depth is to be gradually decreased, the amount of movement of the motion region 1031 in each frame with respect to the dark region 1021 is gradually decreased. For example, when the apparent depth is to be gradually decreased, the amount of movement of the motion region 1031 in each frame with respect to the dark region 1021 is monotonically decreased (or weakly decreased or monotonically non-increased) in a predetermined time segment. There is no limitation on the maximum value of the amount of movement of the motion region 1031 (maximum amount of movement). However, when each motion region 1031 is a region obtained by spatially translating the dark region 1021, a viewing angle for an amount of movement of the motion region 1031 with respect to the dark region 1021 as viewed at a certain distance from the dark region 1021 is desirably equal to or less than 0.35 degrees. Such distance is determined in advance based on an assumed observation position of the observer. Further, each motion region 1031 is desirably a region obtained by spatially translating the dark region 1021 in a direction including a direction component from the dark region 1021 toward the assumed observer (an observer as assumed). Thus, it is possible to clearly perceive the above-described illusion (the reason will be described later). Further, the reason why the position and luminance change unit 108 changes the luminance of the dark region 1021 is as follows. In the physical world, the luminance of a shadow increases as the object moves away from the surface on which the shadow is projected. This is because on the assumption that the light source does not move, when the object is close to the projection plane, the object blocks many rays, but as the object moves away from the projection plane, more rays hit the projection plane. In order to simulate such a physical condition, in the present embodiment, the luminance of the entire motion region 1031 is changed depending on the amount of movement of the motion region 1031 with respect to the dark region 1021. That is, the luminance of the motion region 1031 is uniformly increased with respect to the luminance of the dark region 1021 in accordance with the increase in the amount of movement of the motion region 1031 with respect to the dark region 1021. That is, the motion region 1031 in which the amount of movement with respect to the dark region 1021 is a first value is darker than the motion region in which the amount of movement 1032 with respect to the dark region 1021 is a second value, and the first value is smaller than the second value. Note that the pixel value of the peripheral region 1032 is the same or substantially the same as the pixel value of the peripheral region 1022. The upper limit of the luminance of the motion region 1031 can be set to any level. However, when the luminance of the motion region 1031 is too high, the difference between the luminance of the motion region 1031 and the luminance of the peripheral region 1032 becomes small, which makes it hard to perceive the shadow. Therefore, it is desirable that the peripheral region 1032 has a value that is sufficiently visible from the peripheral region 1032. Further, when the luminance of the motion region 1031 exceeds the luminance of the peripheral region 1032, the color of the shadow becomes brighter (whiter) than the background, which does not match the luminance relationship between the physical shadow and the peripheral region, thereby making it hard for humans to recognize it as a shadow. Therefore, at least the upper limit of the luminance of the motion region 1031 is desirably lower than the luminance of the peripheral region 1032. Hereinafter, the position and luminance change processing will be described in detail.

First, the control information para is input to the input unit 101. The control information para is information for specifying a motion to be given to the dark region 1021 in each frame. An example of the control information para is information for specifying a spatial translation of the dark region 1021. The control information para may be a set of parameters each indicating a motion (e.g., a moving direction and a moving distance) to be given to the dark region 1021 in each frame, may be a parameter for specifying a linear function or a nonlinear function for specifying a motion in each frame, or may be a combination of a parameter for specifying such a linear function or a non-linear function and parameters for specifying other motions. For example, when the motion to be given to the dark region 1021 is a translation specified by a linear function (a linear function that outputs an amount of movement at each time point) and a parameter indicating a moving direction, the control information para includes, for example, an intercept for specifying the linear function (an initial value of the amount of movement), the maximum amount of movement to be given to the dark region 1021, the number of frames corresponding to a series of motions to be given to the dark region 1021 (the maximum number of frames), and the moving direction.

The input control information para is input to the motion calculation unit 107 (FIG. 4). The motion calculation unit 107 specifies and outputs a motion to be given to the dark region 1021 in each frame according to the control information para. As an example, processing of the motion calculation unit 107 will be described that is performed in a case where a spatial amount of movement is determined by applying time information (e.g., frame number) of each frame to a linear function. This linear function has a slope and an intercept. In this case, the control information para includes the intercept, the maximum amount of movement of the motion region 1031 with respect to the dark region 1021, and the number of frames corresponding to a series of motions to be given to the dark region 1021 (the maximum number of frames) which specify the linear function, and the moving direction of the motion region 1031 with respect to the dark region 1021, and the motion calculation unit 107 includes a slope calculation unit 107*a* and a movement amount calculation unit 107*b*. The slope calculation unit 107*a* receives input of the maximum amount of movement and the maximum number of frames, and divides the maximum amount of movement by the maximum number of frames to obtain and output an slope (slope=maximum amount of movement/maximum number of frames). When the maximum number of frames is too small, the slope is larger. In this case, the position of the shadow suddenly changes, and it will be perceived that some dark region that does not look like a shadow suddenly appears rather than a change in the position of the shadow. Therefore, the maximum number of frames desirably has a length corresponding to one second or more. For example, it is desirable that the amount of movement of the motion region 1031 with respect to the dark region 1021 monotonically increases or decreases in half the time segment corresponding to the maximum number of frames, and the half the time segment corresponding to the maximum number of frames is 0.5 seconds or more. The intercept is an initial value of the amount of movement. In a case of causing the observer to have an illusion that the apparent depth gradually increases from a state where there is no apparent depth, the intercept is zero. On the other hand, in a case of causing the observer to have an illusion that the apparent depth gradually increases from a state where the apparent depth has a certain degree, the intercept is larger than zero and smaller than the maximum amount of movement. The movement amount calculation unit 107*b* receives input of the slope and the intercept to specify the linear function. In addition, the movement amount calculation unit 107*b* applies the time information of each frame to the linear function to determine and output an amount of movement of the dark region in each frame.

The amount of movement of the dark region 1021 in each frame output from the movement amount calculation unit 107*b*, the moving direction included in the control information para, and the dark region image 1020 are input to the position and luminance change unit 108. The position and luminance change unit 108 obtains the motion region 1031 by moving the dark region 1021 of the dark region image 1020 according to the amount of movement and the moving direction of the dark region 1021 in each frame and also changing the luminance of the dark region 1021 as described above, and obtains and outputs the motion image 1030 including the motion region 1031 and the peripheral region 1032 for each frame.

The motion image 1030 is input to the mask processing unit 110. The mask processing unit 110 obtains and outputs a video 1040 in which frame images including a shadow region 1041 obtained by performing mask processing on the motion region 1031 included in the motion image 1030 of each frame are arranged in time series. Note that examples of the video 1040 are the above-described Examples 1 and 2 of the "video". The mask processing is processing of replacing pixels of a mask region 1043 at the spatial position corresponding to the target object 1001 (e.g., the spatial region of the target object 1001) with pixels brighter than the motion region 1031 (pixels with higher luminance). For example, the mask processing is processing of replacing pixels of the mask region 1043 of the motion region 1031 with pixels having the same or substantially the same luminance as pixels of the peripheral region (periphery) 1032 of the motion region 1031 (e.g., pixels of the peripheral region 1032). If the pixels included in the background object 1002 and the peripheral regions 1012 and 1022 are the same or substantially the same as the pixels of the peripheral region 1032 of the motion region 1031, mask processing may be performed that replaces the pixels of the mask region 1043 of the motion region 1031 with the pixels included in the background object 1002 and the peripheral regions 1012 and 1022. For example, when the pixel value of the peripheral region (periphery) 1032 of the motion region 1031 is the same or substantially the same as the pixel value of the background object 1002, mask processing may be performed that replaces the pixel value of the motion region 1031 of the mask region 1043 which is the spatial position corresponding to the target object 1001 (e.g., the spatial region of the target object 1001) which is a region having a low pixel value in the target image 1000 with a high pixel value of the background object 1002 in the target image 1000. Each frame image of the video 1040 includes the shadow region 1041, the mask region 1043, and a peripheral region 1042 other than the shadow region 1041 and the mask region 1043. Note that the pixels of the peripheral region 1042 of each frame image are the same or substantially the same as the pixels of the mask region 1043 after the mask processing.

<<Homography Matrix and Pixel Position Transformation Matrix>>

Figure 6A:
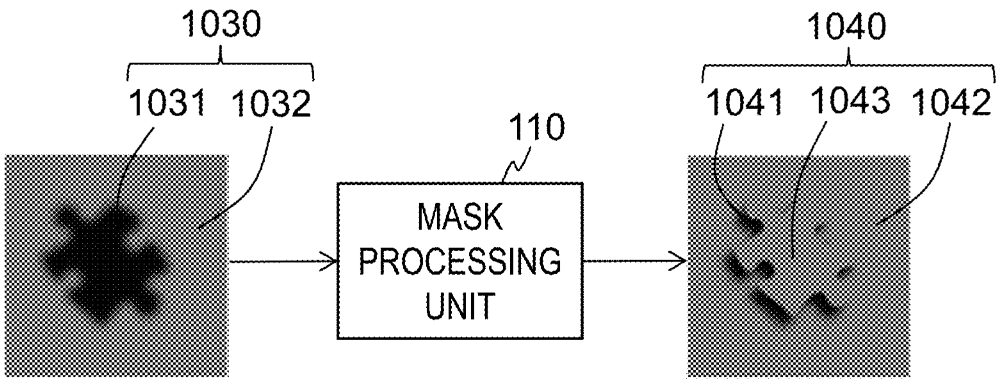
FIG. 6A is a diagram illustrating processing of a mask processing unit according to the embodiment.
Figure 6B:
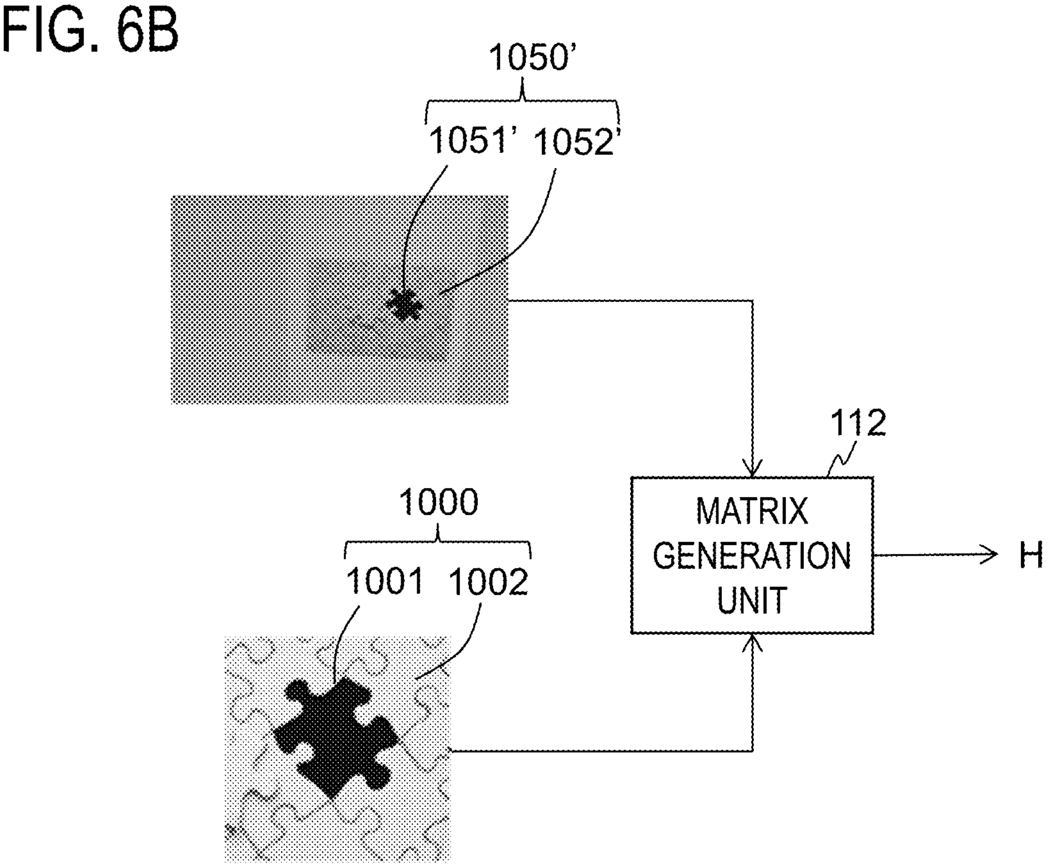
FIG. 6B is a diagram illustrating homography matrix generation processing of a matrix generation unit according to the embodiment.
Figure 7:
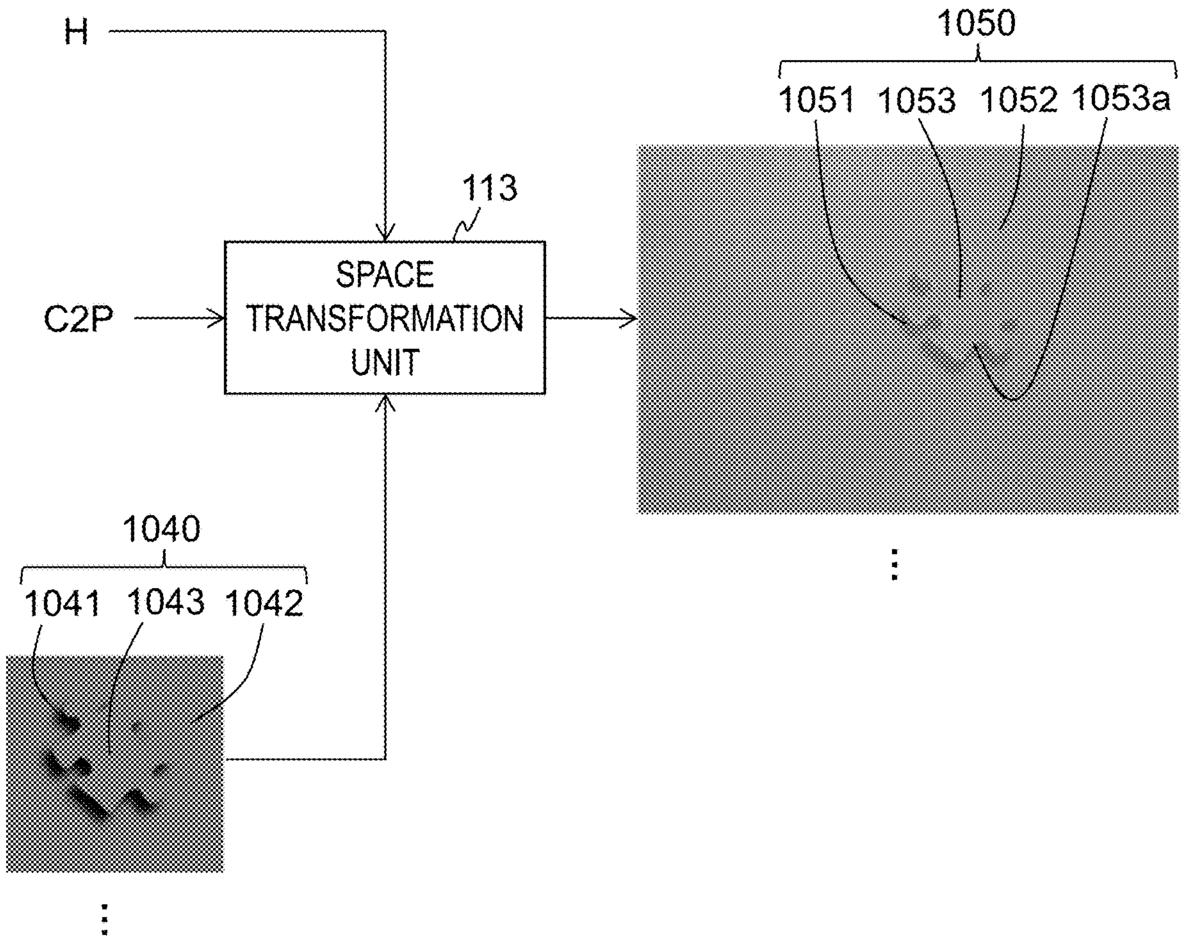
FIG. 7 is a diagram illustrating processing of a space transformation unit according to the embodiment.
Figure 8A:
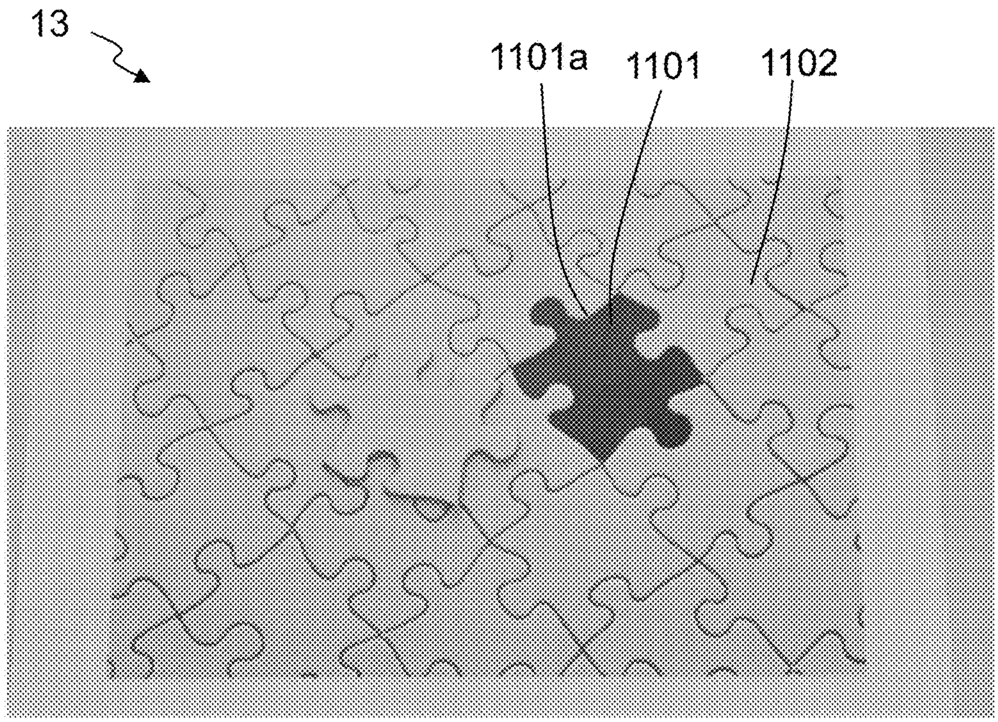
FIG. 8A is a diagram illustrating a real object according to the embodiment.
Figure 8B:
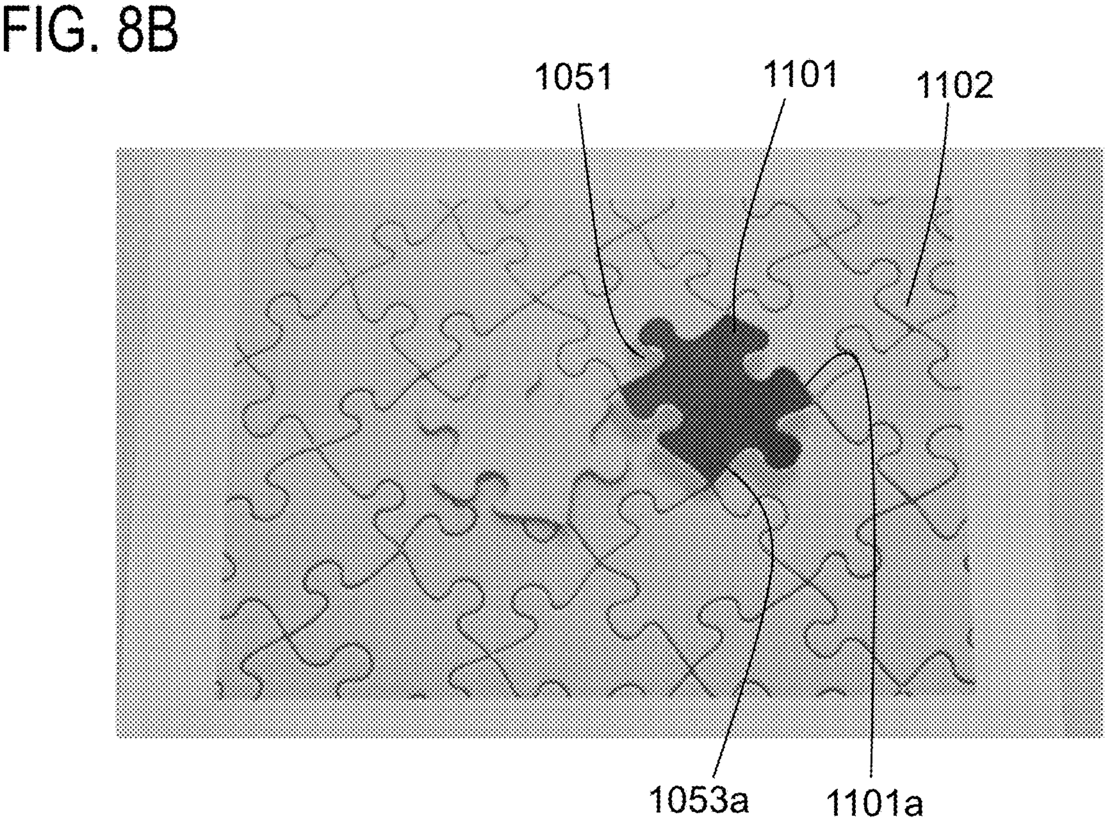
FIG. 8B is a diagram illustrating a state in which an output video according to the embodiment is superimposed on the real object.

Independently of the above processing, transformation information is obtained in advance. The transformation information is for transforming the video 1040 into an output video 1050 (output video 1050 obtained by aligning the video 1040 with the target region 1101) whose mask edge matches the edge 1101*a* (FIG. 8A) of the target region 1101 of the real object 13. Each frame image of the output video 1050 includes a shadow region 1051, a mask region 1053, and a peripheral region 1052 other than the shadow region 1051 and the mask region 1053. In each frame image of the output video 1050, the shadow region 1051, the mask region 1053, and the peripheral region 1052 correspond to the shadow region 1041, the mask region 1043, and the peripheral region 1042, which are included in each frame image of the video 1040, respectively (FIG. 7). An edge 1053*a* of the mask region 1053 included in each frame image of the output video 1050 matches the edge 1101*a* of the target region 1101 of the real object 13 (e.g., the edge 1053*a* and the edge 1101*a* overlap each other) (FIG. 8B). Examples of the transformation information include a homography matrix H and a pixel position transformation matrix (C2P matrix) C2P. The homography matrix is a 3×3 matrix for projecting each frame image of the video 1040 onto the surface of the real object 13. In the present embodiment, first, the image acquisition device 11 acquires an image 1050' of the real object 13 (including a target object 1051' and a background object 1052'). Next, the matrix generation unit 112 receives input of the image 1050' and the target image 1000, performs matching between the image 1050' and the target image 1000, and recognizes an image region matching the target image 1000 in the image 1050'. Further, the matrix generation unit 112 generates and outputs a 3×3 homography matrix H for transforming the target image such that the position and shape of the target image 1000 spatially matches the position and shape of the matched image region (FIG. 6B). Note that the homography matrix H need not be generated when there is no change in the position of the image acquisition device 11 acquired by the target image 1000. Further, the pixel position transformation matrix C2P matches the position of the image acquired by the image acquisition device 11 with the position of the image to be projected onto the real object 13 by the projection device 12. The pixel position transformation matrix C2P is obtained by a well-known Gray code method or the like.

<<Spatial Transformation Processing>>

The space transformation unit 113 receives input of the video 1040, and obtains and outputs the output video 1050 in which the video 1040 is aligned with the target region 1101 of the real object 13. For example, the space transformation unit 113 receives input of transformation information such as the homography matrix H and the pixel position transformation matrix C2P, and the video 1040, transforms the video 1040 into the output video 1050 whose mask edge matches the edge 1101*a* of the target region 1101 of the real object 13, according to the transformation information, and outputs the output video 1050 (FIG. 7). For example, the space transformation unit 113 first transforms each frame image of the video 1040 by using the homography matrix H, and further rearranges the elementary array by using the pixel position transformation matrix C2P, thereby obtaining and outputting each frame image of the output video 1050.

<<Superimposition Processing>>

The output video 1050 is output from the output unit 102 and input to the projection device 12. The projection device 12 projects the output video 1050 onto the real object 13 to superimpose the output video 1050 on the real object 13. That is, the edge 1053*a* of the mask region 1053 (the edge of the spatial region corresponding to the target object) of each frame image of the output video 1050 is superimposed on (aligned with) the edge 1101*a* of the target region 1101 of the real object 13 (FIG. 8B). The observer who views the real object 13 on which the output video 1050 is superimposed in this way recognizes it as if the shadow region 1051 of the output video 1050 were a shadow of the target region 1101 of the real object 13. Changes in the shadow region 1051 make it possible to cause the observer to have an illusion that the target region 1101 included in the real object 13 floats above the background region 1102, and the apparent height (apparent depth) of the target region 1101 with respect to the background region 1102 changes with time. FIG. 8A shows a state of the real object 13 before the output video 1050 is projected thereon, and FIG. 8B shows a state of the real object 13 on which the output video 1050 is projected. In the case of the real object 13 on which a photograph obtained by capturing a puzzle is printed as shown in FIG. 8A, the observer who views the real object 13 onto which the output video 1050 is projected recognizes it as if a shadow of a black missing piece region (target region 1101) were cast, and the shadow moving shows that the black missing piece floats and its apparent height changes.

Figure 5:
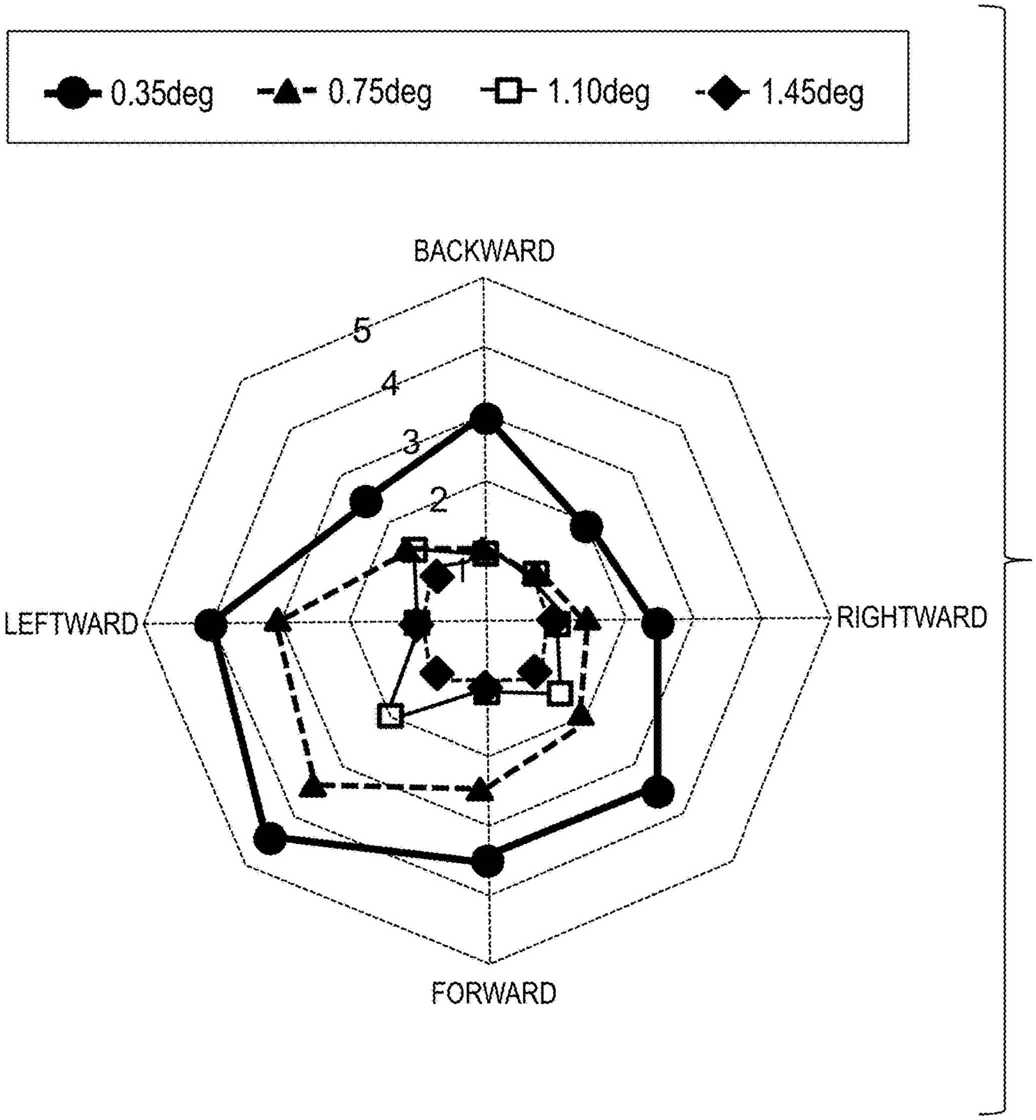
FIG. 5 is a diagram illustrating a relationship between the movement of a shadow region and the perceived content of observers.

Note that when the amount of movement of the shadow region 1051 with respect to the mask region 1053 (the region superimposed on the target region 1101 of the real object 13) of each frame image of the output video 1050 is too large, it is hard to perceive the correspondence between the target region 1101 and the shadow region 1051. That is, the shadow region 1051 may be interpreted as a shadow cast from another object, or may be interpreted as a pattern appearing in the background irrespective of the target region 1101. Therefore, the maximum amount of movement of the shadow region 1051 with respect to the mask region 1053 is desirably equal to or less than a predetermined value. That is, the maximum amount of movement to be given to the dark region 1021 by the position and luminance change unit 108 is desirably equal to or less than a predetermined value. Specifically, a viewing angle of the motion region 1031 with respect to the dark region 1021 as viewed at a certain distance from the dark region 1021 is desirably equal to or less than 0.35 degrees. For example, it is set such that the amount of movement of the shadow region 1051 with respect to the dark region 1021 as viewed at a distance of 100 cm is 0.61 cm or less. Further, the perceptual impression of the observer differs depending on the moving direction of the shadow region 1051 to the observer. Preferably, each motion region 1031 is desirably a region obtained by spatially translating the dark region 1021 in a direction including a direction component from the dark region 1021 toward the observer. The reason will be described below. FIG. 5 shows the relationship among viewing angles of the motion region 1031 with respect to the dark region 1021 corresponding to the amount of movement of the shadow region 1051 with respect to the mask region 1053, moving directions of the shadow region 1051 with respect to the mask region 1053, and strengths of perceptual impression of the observer on the apparent depth of the target region 1101 with respect to the background region 1102, which are obtained by experiments. Black circles each represent a viewing angle of 0.35 degrees (deg), black triangles each represent a viewing angle of 0.75 degrees, white squares each represent a viewing angle of 1.10 degrees, and black squares each represent a viewing angle of 1.45 degrees. The "forward" indicates a direction from the target region 1101 toward the observer (a direction from the dark region 1021 toward the observer), the "backward" indicates a direction opposite to the "forward" (a direction from the observer toward the target region 1101), "rightward" represents the right direction of the target region 1101 as viewed from the observer, and "leftward" represents the left direction of the target region 1101 as viewed from the observer. Further, values of 1 to 5 represented by broken lines indicate degrees of change in "apparent depth" perceived by the observer. The larger the value is, the larger the change in the perceived "apparent depth" is. The experiments were conducted under the condition that the subject reported "1" for perception of no change in the "apparent depth", "5" for perception of a clear change in the "apparent depth", and "3" for perception of ambiguous change in the "apparent depth". As a result, it was found that when the moving distance was 0.35 degrees, the impression on depth change was strong, and when the movement distance was 0.75 degrees, the impression was ambiguous, and when the movement distance was more than 0.75 degrees, the impression on depth change was weak. Further, regarding the moving direction, it was found that it is desirable to move the motion region 1031 "forward" to the observer (in a direction of moving closer to the observer). When it moves "backward", the change in the "apparent depth" is ambiguous even if the moving distance is as short as 0.35 degrees. From these results, the maximum amount of movement to be given to the dark region 1021 by the position and luminance change unit 108 is desirably a viewing angle of 0.35 degrees or less of the motion region 1031 with respect to the dark region 1021 as viewed at a predetermined distance from the dark region 1021, and the moving direction of the dark region 1021 is desirably a direction including a direction component from the dark region 1021 toward the observer.

Modification of First Embodiment

In the first embodiment, all regions of the target object 1001 are darker than the background object 1002. On the other hand, conversely, when all regions of the target object 1001 are brighter than the background object 1002, the content of the thresholding processing is different. In this case, the thresholding unit 105 receives input of a target image 1000 representing the target object 1001 and the background object 1002, and obtains and outputs a dark region image 1010 including a dark region 1011 corresponding to a spatial region brighter than the reference and a peripheral region (background) 1012 of the dark region 1011 in the target image 1000. For example, the thresholding unit 105 obtains, in the input target image 1000, the dark region 1011 in which a pixel value of the spatial region brighter than the reference is set to A, and the peripheral region 1012 in which a pixel value of the other spatial region is set to B. Here, the brightness of the dark region 1011 is darker than the brightness of the peripheral region 1012. Note that the "reference" in this case indicates a brightness that is darker than the target object 1001 and brighter than the background object 1002. The thresholding unit 105 in this case determines, using a threshold corresponding to the reference, a spatial region darker than the reference and the other spatial region in the target image 1000. For example, the thresholding unit 105 sets, as the dark region 1011, a spatial region having a pixel value of A in which a luminance, a pixel value, or the like is higher than the threshold, and sets, as the peripheral region 1012, the other regions having a pixel value of B.

Second Embodiment

In the first embodiment, the shadow region 1051 of the output video 1050 is generated by performing image processing on the dark region 1011 (FIG. 3A) corresponding to all regions of the target region 1101 of the target image 1000 captured by the image acquisition device 11. However, the shadow region of the output video may be generated by performing image processing on a partial region of the target image captured by the image acquisition device 11 as a dark region. For example, the shadow region of the output video may be generated by extracting, as a dark region, only pixels having a value equal to or less than a threshold (or equal to or larger than a threshold) set for one or all of RGB channels forming the target image captured by the image acquisition device 11, and performing image processing on the dark region. This makes it possible to create an illusion that the apparent height of the target region with respect to the background region changes with time, and to change the impression on the material of the target region. In the following, a description will be given focusing on differences from the matters described above, the same matters as those described above will be referred to by the same reference numerals, and a description thereof will be omitted.

<Configuration>

As illustrated in FIG. 1, an illusion system 2 according to the present embodiment includes a video generation device 200, the image acquisition device 11, and the projection device 12, and projects a generated output video onto a real object 23. As illustrated in FIG. 2, the video generation device 200 according to the present embodiment includes the input unit 101, the output unit 102, the storage unit 103, the control unit 104, a thresholding unit 205, the image blur applying unit 106, the motion calculation unit 107, the position and luminance change unit 108, the mask processing unit 110, the matrix generation units 111 and 112, and the space transformation unit 113.

<Processing>

Processing of the present embodiment will be described. The second embodiment differs from the first embodiment only in the target image to be captured and the thresholding processing. Hereinafter, only the input processing of the target image and the thresholding processing in the present embodiment will be described.

<<Input Processing of Target Image>>

Figure 9:
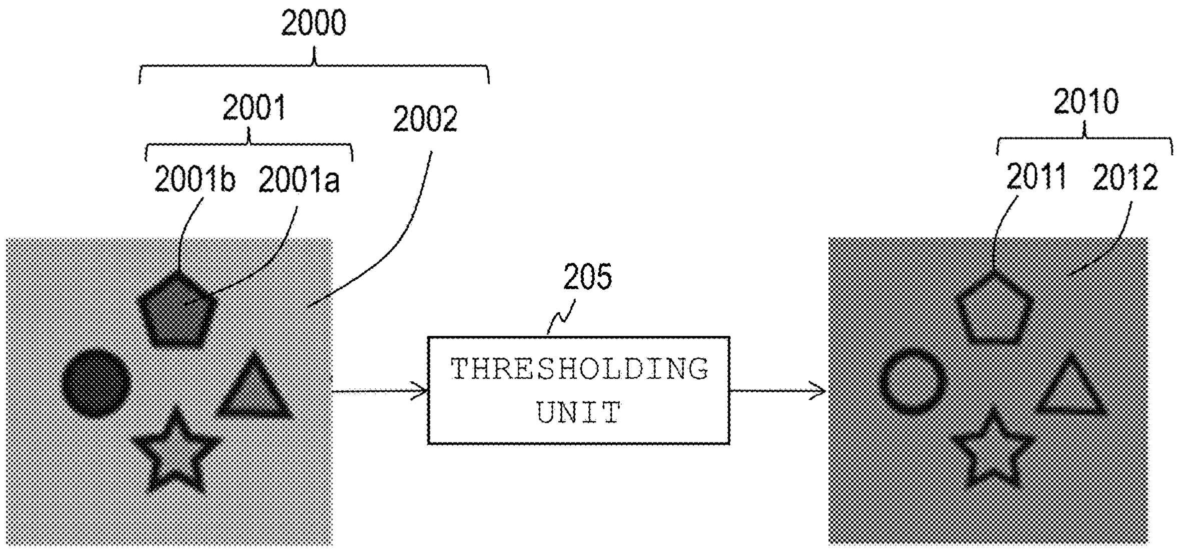
FIG. 9 is a diagram illustrating processing of the thresholding unit according to an embodiment.

First, the image acquisition device 11 captures an image including a target region 2101 and a part or the whole of a background region 2102, which appear on the surface of the real object 23 (FIG. 10A), and obtains and outputs a target image 2000 (FIG. 9). For example, the image acquisition device 11 captures or scans the real object 23 from the front, and obtains and outputs the target image 2000. The real object 23 includes the target region 2101 and the background region 2102, and the target region 2101 includes an edge region 2101*b* (e.g., a black frame portion) and an inner region 2101*a* thereof. The target image 2000 includes a target object 2001 and a background object (background) 2002, and the target object 2001 includes an edge region 2001*b* and an inner region 2001*a* thereof. The target object 2001 corresponds to the target region 2101, and the background object 2002 corresponds to a part or the whole of the background region 2102. The edge region 2001*b* corresponds to the edge region 2101*b*, and the inner region 2001*a* corresponds to the inner region 2101*a*. In the present embodiment, the edge region 2001*b* of the target object 2001 is darker than the inner region 2001*a*, and the edge region 2001*b* and the inner region 2001*a* are darker than the background object 2002 (background). The obtained target image 2000 is input to the input unit 101 of the video generation device 200 and sent to the thresholding unit 205 (FIG. 9).

<<Thresholding Processing>>

As illustrated in FIG. 9, the thresholding unit 205 receives input of the target image 2000, and obtains and outputs a dark region image 2010 including a dark region 2011 corresponding to a spatial region darker than the reference and a peripheral region (background) 2012 of the dark region 2011 in the target image 2000. For example, the thresholding unit 205 obtains, in the input target image 2000, the dark region 2011 in which a pixel value of the spatial region darker than the reference is set to A, and the peripheral region 2012 in which a pixel value of the other spatial region is set to B. The brightness indicated by the pixel value A is darker than the brightness indicated by the pixel value B. How to determine the pixel values A and B is as described in the first embodiment. For example, the pixel value A is set to 0, and the pixel value B is set to 128. In other words, the brightness of the dark region 2011 is darker than the brightness of the peripheral region 2012. Since the dark region 2011 is a region corresponding to a shadow, the dark region 2011 is desirably a black, gray, almost black, or almost gray region. The "reference" in the present embodiment indicates a brightness that is brighter than the edge region 2001*b* and darker than the inner region 2001*a* and the background object 2002. For example, the thresholding unit 205 sets, as the dark region 2011, a spatial region having a pixel value of A in which a luminance, a lightness, a pixel value of any of RGB channels, or pixel values of all RGB channels are lower than the threshold, and sets, as the peripheral region 2012, the other regions having a pixel value of B (a region having a luminance equal to or higher than the threshold). For example, the thresholding unit 205 sets pixels having a pixel value of a specific channel of less than 32 as the dark region 2011, and sets other pixels as the peripheral region 2012 in the input target image 2000. As a result, the dark region image 2010 is obtained that includes the dark region 2011 corresponding to the edge region 2001*b* of the target image 2000 and the peripheral region 2012 corresponding to the inner region 2001*a* and the background object 2002.

Figure 10A:
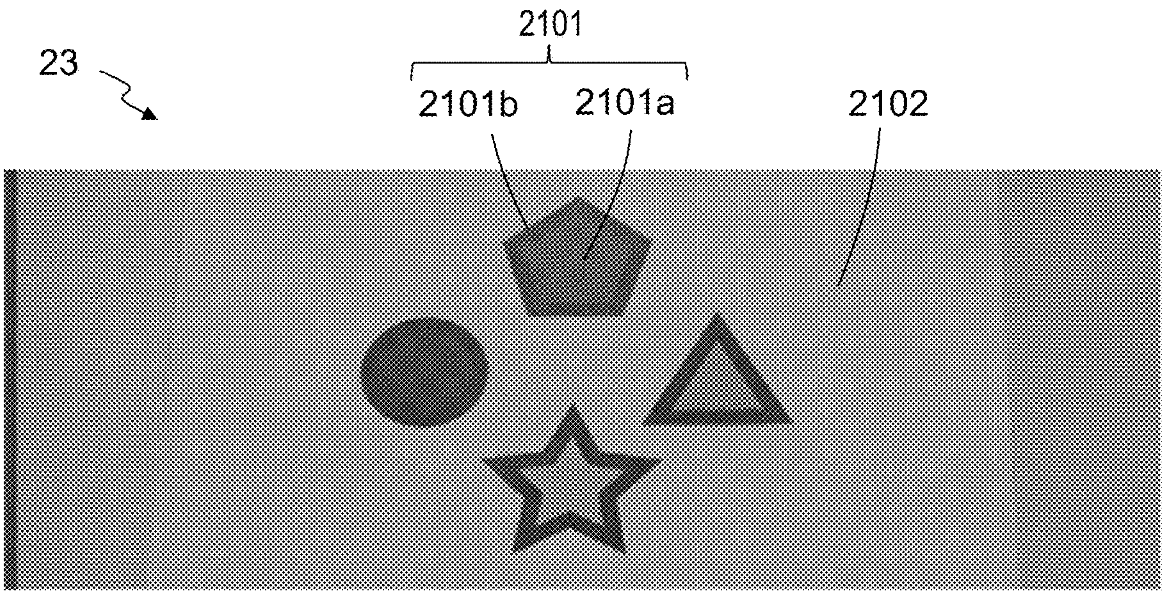
FIG. 10A is a diagram illustrating a real object according to the embodiment.
Figure 10B:
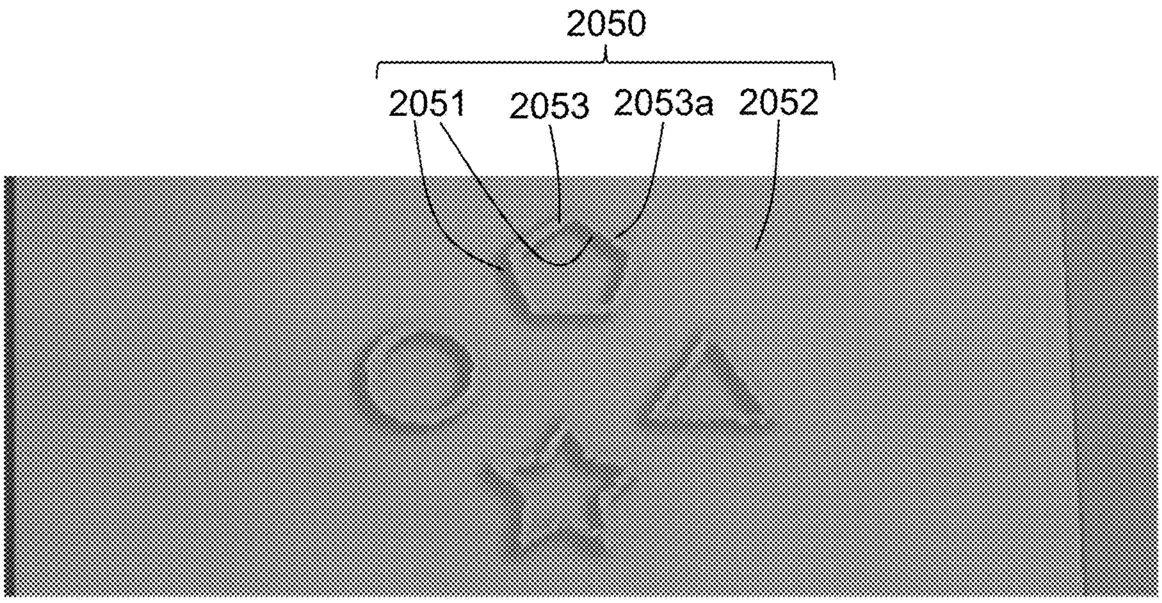
FIG. 10B is a diagram illustrating an output video according to the embodiment.
Figure 11:
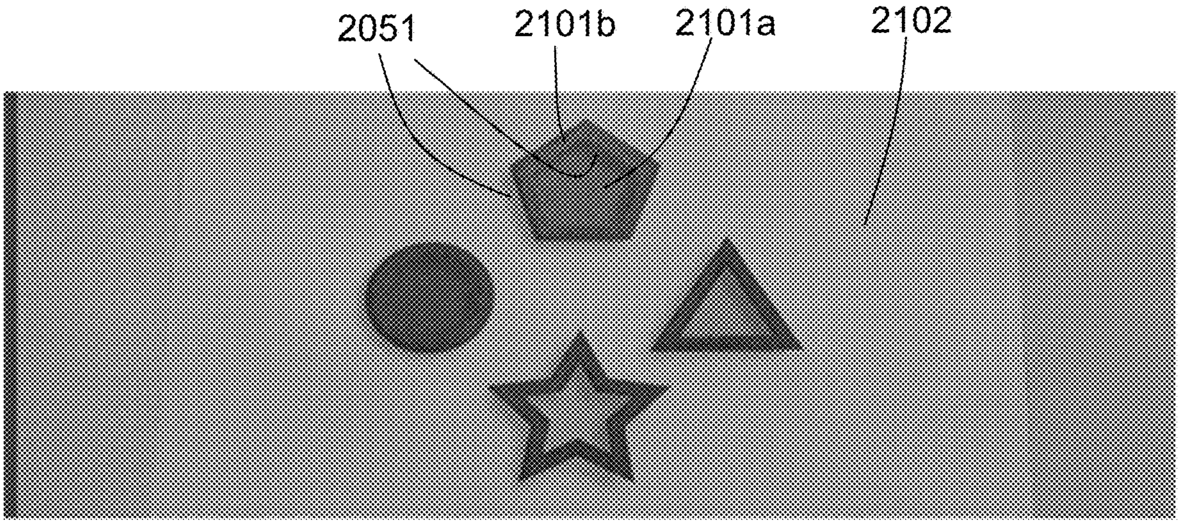
FIG. 11 is a diagram illustrating a state in which an output video according to the embodiment is superimposed on the real object.

Thereafter, instead of the dark region image 1010 including the dark region 1011 and the peripheral region 1012 described in the first embodiment, the dark region image 2010 including the dark region 2011 and the peripheral region 2012 described above is input to the image blur applying unit 106. Then, the image blur adding process is executed. Subsequent processing is the same as in the first embodiment. As illustrated in FIG. 10B, each frame image of an output video 2050 according to the present embodiment includes a shadow region 2051, a mask region 2053, and a peripheral region 2052 other than the shadow region 2051 and the mask region 2053. This output video 2050 is superimposed on the real object 23. That is, an edge 2053*a* of the mask region 2053 (the edge of the spatial region corresponding to the target object) of each frame image of the output video 2050 is superimposed on (aligned with) an edge 2101*b* of the target region 2101 of the real object 23 (FIGS. 10A, 10B, and 11). This makes it possible to make the shadow region 2051 of the output video 2050 appear as if it were a shadow of the edge region 2101*b* of the target region 2101. Further, changes in the shadow region 2051 make it possible to cause the observer to have an illusion that the target region 2101 included in the real object 23 floats above the background region 2102, and the apparent height of the target region 2101 with respect to the background region 2102 changes with time. Furthermore, since it appears that only the edge region 2101*b* of the target region 2101 is given a shadow, an illusion is created that the inner region 2101*a* of the target region 2101 has transparency. This makes it possible to create an illusion that the apparent height of the target region 2101 with respect to the target region 2101 changes with time, and to change the impression on the material of the target region.

Modification of Second Embodiment

In the second embodiment, the edge region 2001*b* of the target object 2001 is darker than the inner region 2101*a*, and the edge region 2001*b* and the inner region 2101*a* are darker than the background object 2002. On the other hand, when the edge region 2001*b* of the target object 2001 is brighter than the inner region 2101*a*, and the edge region 2001*b* and the inner region 2101*a* are brighter than the background object 2002, the content of the thresholding processing is different. In this case, the thresholding unit 205 receives input of a target image 2000 representing the target object 2001 and the background object 2002, and obtains and outputs a dark region image 2010 including a dark region 2011 corresponding to a spatial region brighter than the reference and a peripheral region (background) 2012 of the dark region 2011 in the target image 2000. For example, the thresholding unit 205 obtains, in the input target image 2000, the dark region 2011 in which a pixel value of the spatial region brighter than the reference is set to A, and the peripheral region 2012 in which a pixel value of the other spatial region is set to B. Here, the brightness of the dark region 2011 is darker than the brightness of the peripheral region 2012. Note that the "reference" in this case indicates a brightness that is darker than the edge region 2001*b* and brighter than the inner region 2001*a* and the background object 2002. The thresholding unit 205 in this case determines, using a threshold corresponding to the reference, a spatial region brighter than the reference and the other spatial region in the target image 2000. For example, the thresholding unit 205 sets, as the dark region 2011, a spatial region having a pixel value of A in which a luminance, a pixel value, or the like is higher than the threshold, and sets, as the peripheral region 2012, the other regions having a pixel value of B.

Third Embodiment

In the first and second embodiments, the image acquisition device 11 captures an image appearing on the surface of a real object, and a part of the target image thus obtained is used to generate a dark region, and an output video is generated by performing image processing on the dark region. On the other hand, the output video may be generated by using a dark region where the shape, design, and spatial position are not directly related to the image appearing on the surface of the real object. In other words, assuming a desired virtual target image al, it is also possible to create an illusion that the apparent depth of the target image al in the real object changes due to the motion of the shadow of the target image al.

<Configuration>

As illustrated in FIG. 1, an illusion system 3 according to the present embodiment includes a video generation device 300, the image acquisition device 11, and the projection device 12, and projects a generated output video onto the real object 13. As illustrated in FIG. 2, the video generation device 300 according to the present embodiment includes an input unit 301, the output unit 102, the storage unit 103, the control unit 104, the thresholding unit 105, the image blur applying unit 106, the motion calculation unit 107, the position and luminance change unit 108, the mask processing unit 110, the matrix generation units 111 and 112, and the space transformation unit 113.

<Processing>

Processing of the present embodiment will be described. The third embodiment differs from the first and second embodiments only in the input processing of the target image. Hereinafter, only the thresholding processing of the embodiment will be described.

<<Input Processing of Target Image>>

Figure 12A:
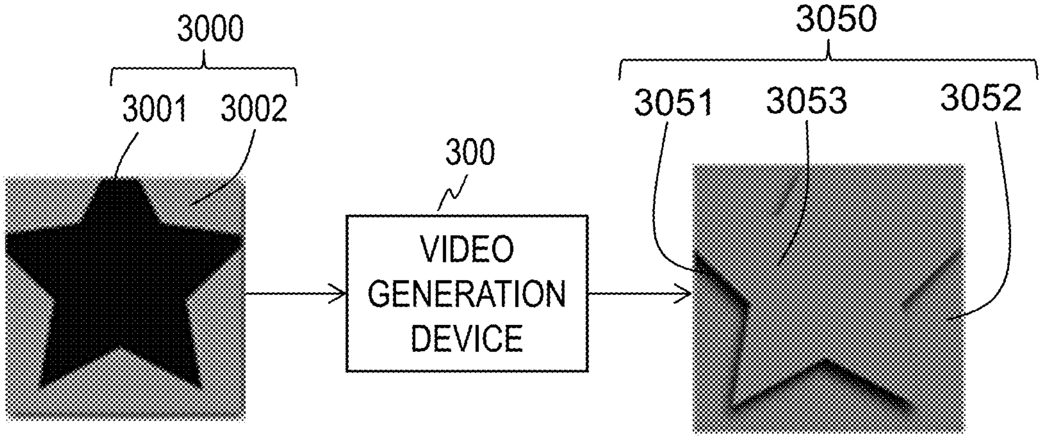
FIG. 12A is a diagram illustrating processing of a video generation device according to an embodiment.
Figure 12B:
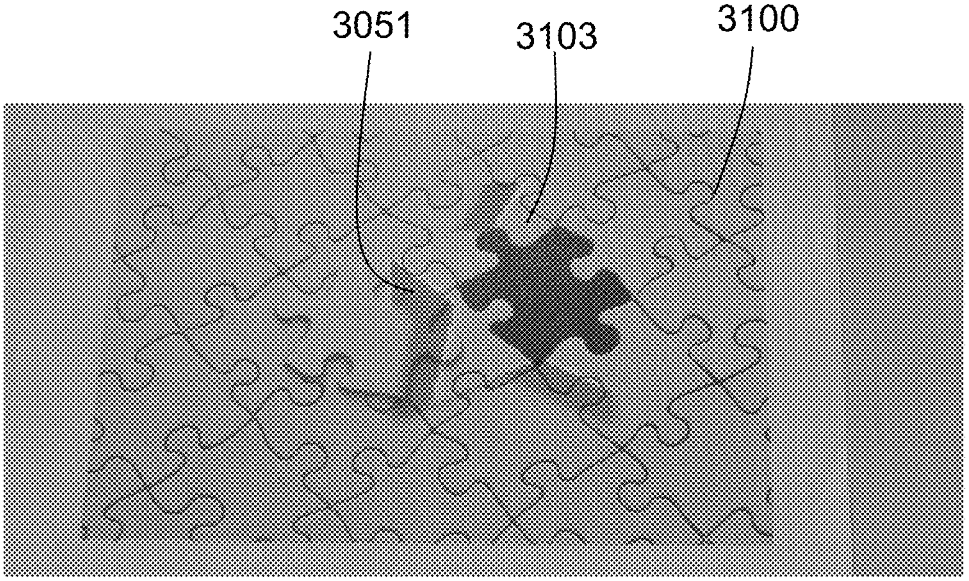
FIG. 12B is a diagram illustrating a state in which an output video according to the embodiment is superimposed on a real object.

In the present embodiment, an image obtained independently of the real object 13 or 23 (an image whose shape, design, and spatial position are not directly related to the real object 13) is a target image 3000. The target image 3000 includes a desired virtual target object 3001 and a background object (background) 3002 (FIG. 12A). The target object 3001 is different in brightness from the background object 3002. The target object 3001 may be a region having the same brightness as in the first embodiment as a whole, or may be a region including an edge region and an inner region as in the second embodiment. For example, the target object 3001 of the target image 3000 illustrated in FIG. 12A is a star-shaped region darker than the background object 3002.

Subsequent processing is the same as those of any one of the first embodiment, the modification of the first embodiment, the second embodiment, and the second embodiment, except that the target image 3000 is used instead of the target images 1000 and 2000. As a result, an output video 3050 is obtained. Each frame image of the output video 3050 in the present embodiment includes a shadow region 3051, a mask region 3053, and a peripheral region 3052 other than the shadow region 3051 and the mask region 3053 (FIG. 12A). Superimposing the output video 3050 onto the real object 13 or 23 makes it possible to make the shadow region 3051 of the output video 3050 appear as if it were a shadow of a virtual region 3103 in the real object 13 or 23. Further, changes in the shadow region 3051 make it possible to cause the observer to have an illusion that the virtual region 3103 included in the real object 13 or 23 floats above a background region 3100, and the apparent height of the region 3103 with respect to the background region 3100 changes with time.

Modification of Third Embodiment

In the third embodiment, the output video is generated by using a dark region where the shape, design, and spatial position are not directly related to the image appearing on the surface of the real object. As a modification of the third embodiment, an output video may be generated by using only an edge portion (an edge region having a predetermined width) of the target object as the mask region, and then the output video may be superimposed onto a real object including a target region (e.g., a target region having uniform or substantially uniform brightness) having no edge portion (e.g., no black frame portion or no white frame portion). Here, the outer peripheral shape of the mask region of the output video is the same or substantially the same as the outer peripheral shape of the target region included in the real object, and the output video is superimposed onto the target region so that the edge of the outer peripheral shape of the mask region of the output video overlaps the edge of the outer peripheral shape of the target region included in the real object. For example, the output video 2050 (FIG. 10B) exemplified in the second embodiment may be superimposed onto a real object including a target region β obtained by replacing the pixels of the edge region 2101*b* (black frame portion) of the target region 2101 of the real object 23 (FIG. 10A) with the pixels of the inner region 2101*a*. Here, the output video 2050 is superimposed on the real object including the target region β so that the edge of the outer peripheral of the mask region 2053 of the output video 2050 overlaps the edge of the outer peripheral shape of the target region β. This makes it possible to cause the observer to have an illusion that the target region β included in the real object floats above the background region, and the apparent height of the target region with respect to the background region changes with time.

Fourth Embodiment

A data structure may be provided in which first data, second data, and third data are associated with each other. The first data indicates an image including a target region, the second data is a video group or an image group which indicates videos corresponding to motions of a plurality of types of shadows (e.g., a shadow region) of the target region, and the third data indicates a parameter group for specifying the motions of the plurality of types of shadows of the target region. The image including the target region may be acquired from an image appearing on the surface of the real object as in the first and second embodiments, or may be generated independently of the real object as in the third embodiment. The video corresponding to the motions of the plurality of types of shadows in the target region is, for example, the video 1040 generated in the first to third embodiments or their modifications. The parameter group for specifies the motions of the plurality of types of shadows of the target region is the control information para corresponding to the respective motions of the plurality of types of shadows of the target region. The following is an example of such a data structure.

TABLE 1

| First Data | Second Data | Third Data |
|---|---|---|
| Image $P_1$ | Video group or Image group $M_{1,1}$ | $para_{1,1}$ |
| Image $P_1$ | Video group or Image group $M_{1,2}$ | $para_{1,2}$ |
| . . . | . . . | . . . |
| Image $P_1$ | Video group or Image group $M_{1,9}$ | $para_{1,9}$ |
| Image $P_2$ | Video group or Image group $M_{2,1}$ | $para_{2,1}$ |
| . . . | . . . | . . . |
| Image $P_{99}$ | Video group or Image group $M_{99,1}$ | $para_{99,1}$ |
| . . . | . . . | . . . |
| Image $P_{99}$ | Video group or Image group $M_{99,8}$ | $para_{99,8}$ |

In the data structure of this example, first data that indicates a plurality of images $P_i$, second data that is a video group or an image group $M_{i,j}$ indicating videos corresponding to motions of a plurality of types of shadows of a target region corresponding to each image $P_i$, and third data that indicates a parameter group $para_{i,j}$ for specifying the motions of the plurality of types of shadows of the target region, are associated with each other. Here, i and j are integers of 1 or more, and the upper limits of i and j are determined in advance in accordance with the number of records. The shadow represented by the video group or the image group $M_{i,j}$ is darker than the background region of the target region included in the image $P_i$. The parameters $para_{i,j}$ belonging to the parameter group are associated with the respective motions of the shadow represented by the video group or the image group $M_{i,j}$. The videos $M_{i,j}$ included in the second data are associated with the parameters $para_{i,j}$ included in the third data in a one-to-one relationship. By designating one parameter $para_{i,j}$, the corresponding video $M_{i,j}$ can be specified. The image group $M_{i,j}$ included in the second data is an image group (a group of images) with time information that can be frame images of a video. The image group $M_{i,j}$ with time information that can be frame images of one video is associated with the respective parameters $para_{i,j}$ included in the third data. By designating one parameter $para_{i,j}$, the corresponding video $M_{i,j}$ in the group can be specified, and the video can be reproduced by using the video $M_{i,j}$ as frame images in accordance with the time information. Note that each video $M_{i,j}$ included in the second data can be generated by, for example, the method described in the first to third embodiments.

Figure 13:
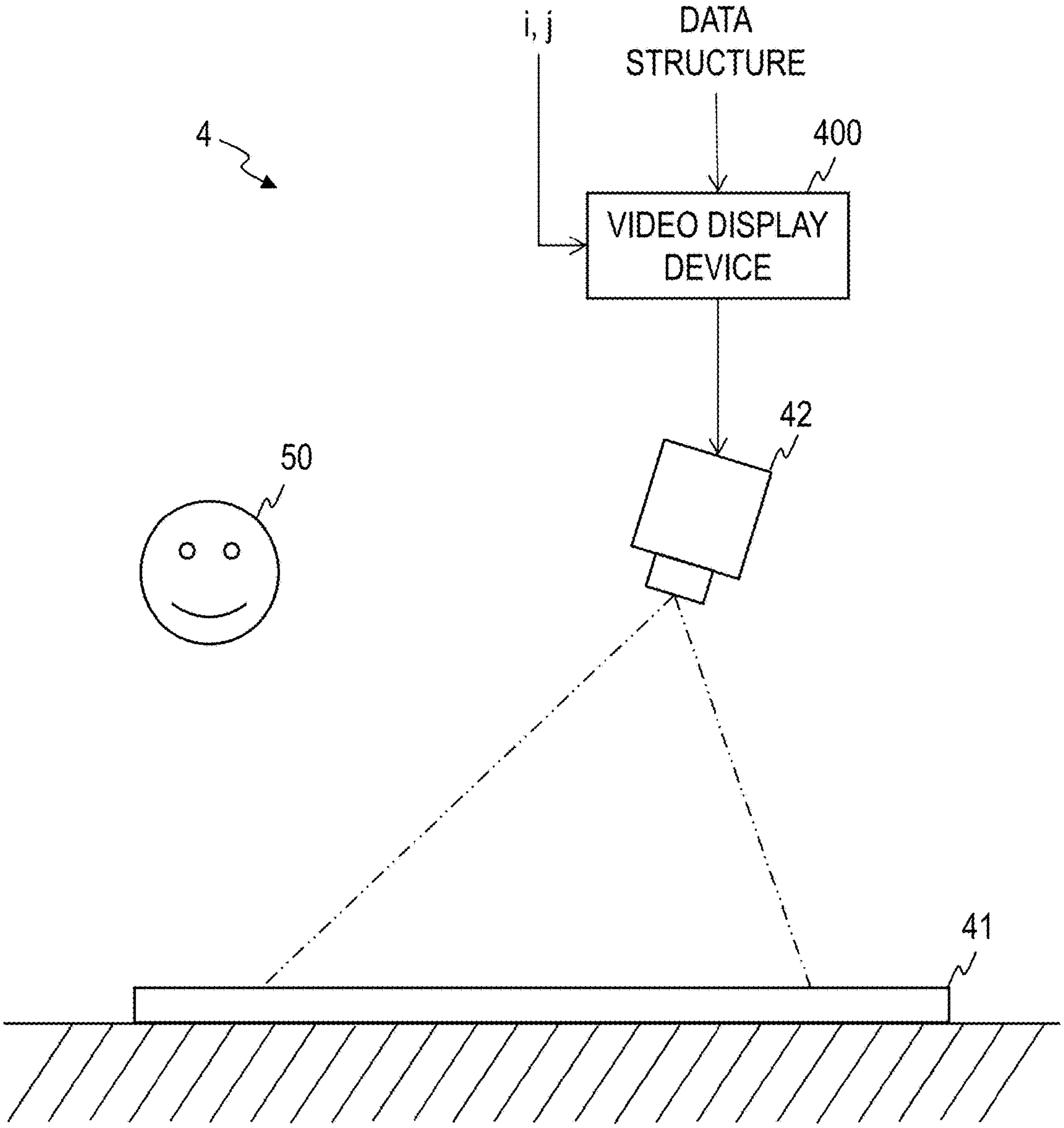
FIG. 13 is a conceptual diagram illustrating a configuration of a video display system according to an embodiment.

Data having such a data structure has properties suitable for a program that defines processing by hardware. FIG. 13 illustrates an illusion system 4 that executes processing based on such a data structure. The illusion system 4 includes a video display device 400, a projection device 42, and a real object 41. The real object 41 may be an actual object including a target region represented by one of the images $P_i$ included in the first data, may be a virtual object (e.g., an image displayed on a display) including the target region represented by the image $P_i$, or may be an object on which the target region represented by the image $P_i$ is printed or drawn. Information i for specifying an image $P_i$ corresponding to the real object 41, information j for specifying a video corresponding to the motion of the shadow, and a data structure are input to the video display device 400. The information i may be input by the user, may be automatically set from an image obtained by capturing an image of the real object 41, or may be automatically extracted from data of the real object 41 output from an external device. The information j may be input by the user, may be provided from an external device, or may be determined in advance. The video display device 400 sends an output video to the projection device 42 in accordance with the correspondence between the first data, the second data, and the third data, and the projection device 42 projects, onto the real object 41, a video or an image group $M_{i,j}$ representing the motion of the shadow of the target region represented by the second data corresponding to one of the parameters $para_{i,j}$ belonging to the parameter group indicated by the third data. In this way, the video display device 400 superimposes the video or image group $M_{i,j}$ onto the real object 41. This makes it possible to cause an observer 50 who views the real object 41 on which the video or the image group $M_{i,j}$ is superimposed to have an illusion that the target region of the real object 41 floats above the background region and the apparent height of the target region with respect to the background region changes with time.

As exemplified in the first and second embodiments, the target region may include a first edge whose absolute value is a spatial frequency component larger than zero, and the video group or the image group $M_{i,j}$ may include a second edge (whose absolute value is a spatial frequency component larger than zero) corresponding to the first edge. In this case, the first data is data in which image data indicating the image Pi is associated with horizontal position information (horizontal coordinates) and vertical position information (vertical coordinates) of the image data, and the second data is data in which image data indicating the video $M_{i,j}$ included in the video group or the image $M_{i,j}$ included in the image group is associated with horizontal position information and vertical position information of the image data. The horizontal position information and the vertical position information of the image data included in the first data and the horizontal position information and the vertical position information of the image data included in the second data are associated with each other. The first data and/or the second data includes correspondence information (e.g., pointers) for associating the horizontal position information and the vertical position information of the image data included in the first data with the horizontal position information and the vertical position information of the image data included in the second data. In this case, the video display device 400 superimposes the video or the image group $M_{i,j}$ onto the real object 41 by aligning, according to the correspondence information, the horizontal position information and the vertical position information of the image data included in the first data, and the horizontal position information and the vertical position information of the image data included in the second data, the horizontal position and the vertical position of the second edge of the video or the image group $M_{i,j}$ representing the motion of the shadow of the target region represented by the second data corresponding to the parameter $para_{i,j}$ belonging to the parameter group indicated by the third data with the horizontal position and the vertical position of the first edge of the target region in the real object 41.

First Modification of Fourth Embodiment

Figure 14:
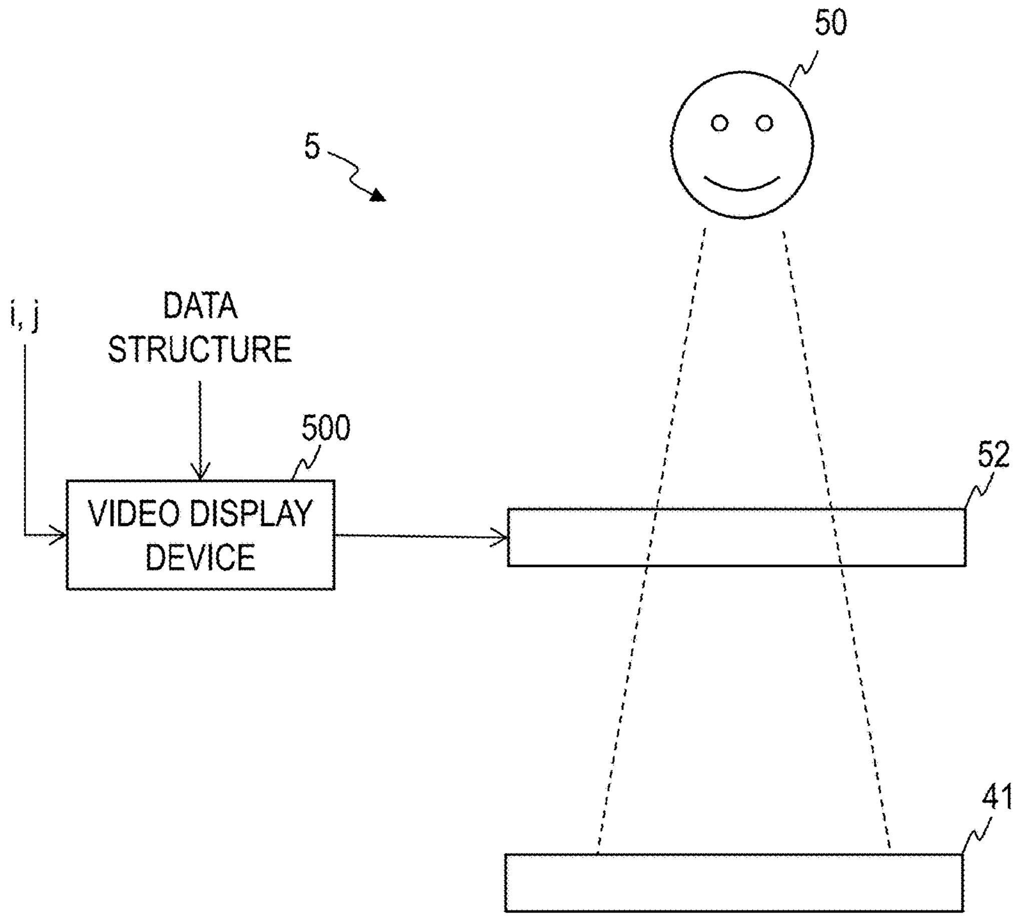
FIG. 14 is a conceptual diagram illustrating a configuration of a video display system according to an embodiment.

FIG. 14 illustrates another illusion system 5 that executes processing based on the above-described data structure. The illusion system 5 includes a video display device 500, a transparent display 52, and the real object 41. Information i for specifying an image $P_i$ corresponding to the real object 41, information j for specifying a video corresponding to the motion of the shadow, and the above-described data structure are input to the video display device 500. The video display device 500 sends an output video to the transparent display 52 in accordance with the correspondence between the first data, the second data, and the third data, and the transparent display 52 displays a video or an image group $M_{i,j}$ representing the motion of the shadow of the target region represented by the second data corresponding to one of the parameters $para_{i,j}$ belonging to the parameter group indicated by the third data. The observer 50 observes the real object 41 through the transparent display 52 on which the video or image group $M_{i,j}$ is displayed. This allows the observer 50 to view the real object 41 on which the video or the image group $M_{i,j}$ is superimposed, and to perceive the illusion as described above.

Second Modification of Fourth Embodiment

Figure 15A:
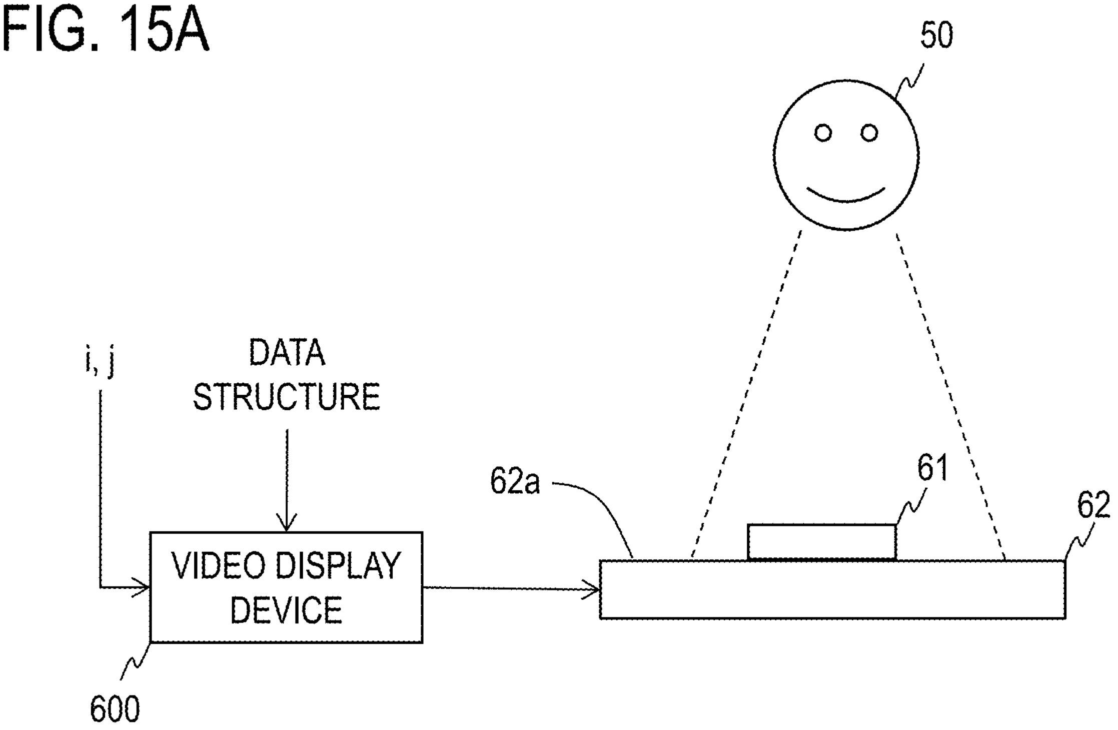
FIGS. 15A and 15B are conceptual diagrams illustrating a configuration of a video display system according to an embodiment.
Figure 15B:
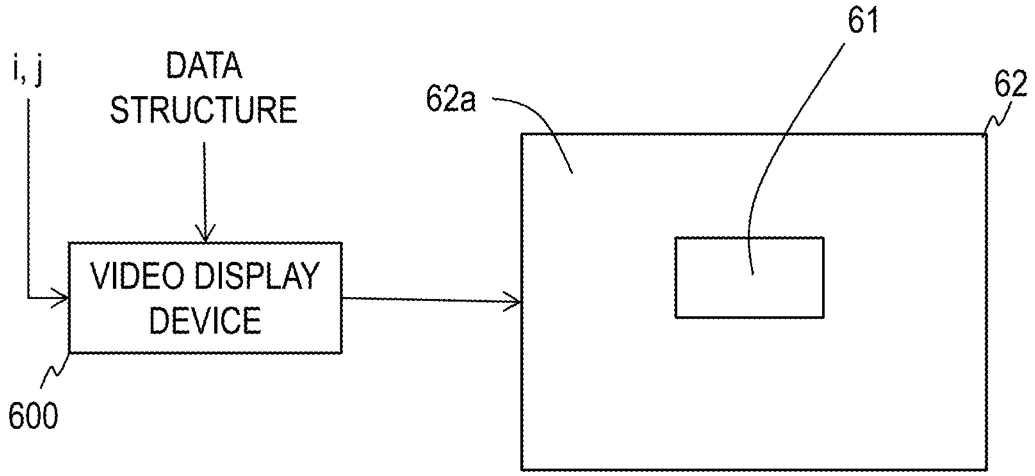

FIGS. 15A and 15B illustrate another illusion system 6 that executes processing based on the above-described data structure. The illusion system 6 includes a video display device 600, a tabletop display 62, and a real object 61. The real object 61 is an actual object (e.g., a three-dimensional object or a sheet). The real object 61 is placed on a display surface 62*a* of the display 62. Information i for specifying an image $P_i$ corresponding to the real object 61, information j for specifying a video corresponding to the motion of the shadow, and the above-described data structure are input to the video display device 600. The video display device 600 sends an output video to the display 62 in accordance with the correspondence between the first data, the second data, and the third data, and the display 62 displays a video or an image group $M_{i,j}$ representing the motion of the shadow of the target region represented by the second data corresponding to one of the parameters $para_{i,j}$ belonging to the parameter group indicated by the third data. Thus, the video or image group $M_{i,j}$ is superimposed onto the real object 61. The observer 50 who observes this state perceives the illusion as described above.

Third Modification of Fourth Embodiment

In addition, data of one of the images $P_i$ included in the first data may be a real object, and then the video display device may superimpose, using information i for specifying an image $P_i$ corresponding to the input real object, information j for specifying a video corresponding to a motion of the shadow, and the above-described data structure, the image $P_i$ and a video or image group $M_{i,j}$ by image processing, and display the superimposed image data on the display. The observer who views the image data displayed on the display perceives the illusion as described above.

[Other Modifications, Etc.]

Note that the present invention is not limited to the above embodiments. For example, depending on the target input to the video generation device, at least one of the thresholding processing and the image blur applying processing may be omitted. For example, in a case where the thresholding processing is omitted, an image including the target object input to the video generation device may be input to the image blur applying unit 106, and the subsequent processing may be performed. For example, in a case where the thresholding processing and the image blur applying processing are omitted, an image including the target object input to the video generation device may be input to the position and luminance change unit 108, and the subsequent processing may be performed. For example, in a case where the thresholding processing is performed but the image blur applying processing is omitted, an image output from the thresholding unit 105 or 205 may be input to the position and luminance change unit 108, and the subsequent processing may be performed.

When the output video is superimposed onto the real object by a method other than projection, the spatial transformation processing using a homography matrix or a pixel position transformation matrix can be omitted. That is, the video obtained by the position and luminance change unit 108 may be the output video.

In the above-described embodiments, the position and luminance change unit 108 gives a motion to the dark region and also changes the luminance. However, the luminance may be changed after an image in which a motion is given to the dark region, or a motion may be given after an image in which the luminance of the dark region is changed is generated.

The various steps of processing described above may be executed not only in time series as described, but also in parallel or individually according to the processing capability of the device that executes the processing or as necessary. In addition, it goes without saying that variations are possible as appropriate without departing from the spirit of the present invention.

Each of the above devices (each of the video generation device and the video display device) is configured by a general-purpose or special-purpose computer that includes, for example, a processor (hardware processor) such as a CPU (central processing unit), and a memory such as a RAM (random-access memory) and a ROM (read-only memory), executing a predetermined program. Such a computer may include one processor or memory, or may include a plurality of processors or memories. Such a program may be installed in the computer, or may be recorded in a ROM or the like in advance. Also, some or all of the processing units may be configured using an electronic circuit that implements a processing function without using a program, instead of an electronic circuit (circuitry) such as a CPU that reads a program to implement a functional configuration. An electronic circuit constituting one device may include a plurality of CPUs.

When the above configuration is implemented by a computer, the processing contents of functions to be included in each device are described by a program. By executing the program on the computer, the above-described processing functions are implemented on the computer. The program describing the processing contents can be recorded on a computer-readable recording medium. An example of the computer-readable recording medium is a non-transitory recording medium. Examples of such a recording medium include a magnetic recording device, an optical disk, a magneto-optical recording medium, a semiconductor memory, and the like.

The distribution of such a program is carried out, for example, by selling, transferring, lending, or the like, a portable recording medium such as a DVD or a CD-ROM on which the program is recorded. Further, the program may be stored in a storage device of a server computer, and the program may be distributed by transferring the program from the server computer to another computer via a network.

A computer that executes such a program first stores, for example, a program recorded on a portable recording medium or a program transferred from a server computer in its own storage device. When executing processing, the computer reads the program stored in its own storage device and executes the processing in accordance with the read program. As another execution form of the program, the computer may read the program directly from the portable recording medium and execute processing in accordance with the program, and in addition, each time the program is transferred from a server computer to this computer, the computer may sequentially execute the processing in accordance with the received program. A configuration may be provided in which the above-described processing is executed by a so-called ASP (Application Service Provider) service, which implements the processing functions only by instruction to execute a program and acquisition of the results without transferring the program from a server computer to the computer.

Instead of executing a predetermined program on a computer to implement the processing functions of the present device, at least a part of the processing functions may be implemented by hardware.

REFERENCE SIGNS LIST

100, 200, 300 Video generation device
400, 500, 600 Video display device

The invention claimed is:

1. A video generation device comprising processing circuitry configured to implement a video generation unit that receives input of a dark region image including a dark region that is a spatial region corresponding to a target object and is darker than a background, and control information for specifying a motion to be given to the dark region, and obtains and output a video including a shadow region, the shadow region being obtained by performing mask processing on a motion region obtained by giving the motion to the dark region according to the control information, the mask processing replacing pixels of a mask region at a spatial position corresponding to the target object with pixels brighter than the motion region, wherein the video generation device generates the video in which superimposing an output video corresponding to the video on a real object to cause an observer, who views the real object on which the output video is superimposed, to have an illusion that a target region included in the real object corresponding to the target object floats above a background region and an apparent height of the target region with respect to the background region changes with time.

2. The video generation device according to claim 1, wherein each motion region is a region obtained by spatially translating the dark region, and a viewing angle of an amount of movement of the motion region with respect to the dark region as viewed at a certain distance from the dark region is equal to or less than 0.35 degrees.

3. The video generation device according to claim 1, wherein each motion region is a region obtained by spatially translating the dark region in a direction including a direction component from the dark region toward the observer.

4. The video generation device according to claim 1, wherein an amount of movement of the motion region with respect to the dark region monotonically increases in a predetermined time segment, or monotonically decreases in the predetermined time segment, and the predetermined time segment is 0.5 second or more.

5. The video generation device according to claim 1, wherein a sharpness of the dark region is lower than a sharpness of the target object.

6. The video generation device according to claim 1, wherein a brightness of the motion region in which an amount of movement with respect to the dark region is a first value is lower than a brightness of the motion region in which an amount of movement with respect to the dark region is a second value, and the first value is smaller than the second value.

7. The video generation device according to claim 1, further comprising:

(1) a thresholding unit that receives input of a target image representing the target object and the background, and obtains the dark region image including the dark region corresponding to a spatial region darker than a reference and a peripheral region of the dark region in the target image, wherein all regions of the target object are darker than the background, the reference indicates a brightness that is brighter than the target object and darker than the background, and the peripheral region is brighter than the dark region; or (2) a thresholding unit that receives input of a target image representing the target object and the background, and obtains the dark region image including the dark region corresponding to a spatial region brighter than a reference and a peripheral region of the dark region in the target image, wherein all regions of the target object are brighter than the background, the reference indicates a brightness that is darker than the target object and brighter than the background, and the peripheral region is brighter than the dark region.

8. The video generation device according to claim 1, further comprising:

(1) a thresholding unit that receives input of a target image representing the target object and the background, and obtains the dark region image including the dark region corresponding to a spatial region darker than a reference and a peripheral region of the dark region in the target image, wherein an edge region of the target object is darker than an inner region of the target object, the edge region and the inner region are darker than the background, the reference indicates a brightness that is brighter than the edge region and darker than the inner region and the background, and the peripheral region is brighter than the dark region; or (2) a thresholding unit that receives input of a target image representing the target object and the background, and obtains the dark region image including the dark region corresponding to a spatial region brighter than a reference and a peripheral region of the dark region in the target image, wherein an edge region of the target object is brighter than an inner region of the target object, the edge region and the inner region are brighter than the background, the reference indicates a brightness that is darker than the edge region and brighter than the inner region and the background, and the peripheral region is brighter than the dark region.

9. The video generation device according to claim 1, wherein the target object corresponds to the target region included in the real object, and the video generation device generates the video in which superimposing an edge of a spatial region corresponding to the target object in the output video on an edge of the target region to cause the observer to have an illusion that the target region floats above the background region and an apparent height of the target region with respect to the background region changes with time.

10. The video generation device according to claim 9, wherein the mask region is an edge portion of a spatial region corresponding to the target object.

11. The video generation device according to claim 1, wherein the mask processing is processing of replacing pixels in the mask region in the motion region with pixels having the same or substantially the same luminance as pixels around the motion region.

12. The video generation device according to claim 1, wherein the target object corresponds to the target region included in the real object, the video generation device further comprises a spatial transformation unit that receives input of the video, and obtains and outputs the output video in which the video is aligned with the target region, and the video generation device generates the video in which projecting the output video onto the real object to cause the observer to have an illusion that the target region floats above the background region and an apparent height of the target region with respect to the background region changes with time.

13. A video generation method comprising a video generation step of receiving input of a dark region image including a dark region that is a spatial region corresponding to a target object and is darker than a background, and control information for specifying a motion to be given to the dark region, and obtaining and outputting a video including a shadow region, the shadow region being obtained by performing mask processing on a motion region obtained by giving the motion to the dark region according to the control information, the mask processing replacing pixels of a mask region at a spatial position corresponding to the target object with pixels brighter than the motion region, wherein the video generation method generates the video in which superimposing an output video corresponding to the video on a real object to cause an observer, who views the real object on which the output video is superimposed, to have an illusion that a target region included in the real object corresponding to the target object floats above a background region and an apparent height of the target region with respect to the background region changes with time.

14. A non-transitory computer-readable recording medium storing a program for causing a computer to function as the video generation device according to claim 1.

* * * * *